United States Patent
Kohlmeier et al.

(10) Patent No.: US 11,232,145 B2
(45) Date of Patent: Jan. 25, 2022

(54) CONTENT CORPORA FOR ELECTRONIC DOCUMENTS

(71) Applicant: Microsoft Technology Licensing, LLC, Redmond, WA (US)

(72) Inventors: Bernhard S. J. Kohlmeier, Seattle, WA (US); Nathaniel George Freier, Seattle, WA (US); Douglas M. Taylor, Kirkland, WA (US); Chenguang Yang, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 224 days.

(21) Appl. No.: 15/926,668

(22) Filed: Mar. 20, 2018

(65) Prior Publication Data

US 2019/0294728 A1 Sep. 26, 2019

(51) Int. Cl.
| | | |
|---|---|---|
| *G06F 16/38* | (2019.01) | |
| *G06F 16/93* | (2019.01) | |
| *G06F 16/31* | (2019.01) | |
| *G06F 16/332* | (2019.01) | |
| *G06N 5/02* | (2006.01) | |
| *G06N 3/00* | (2006.01) | |

(52) U.S. Cl.
CPC .......... *G06F 16/381* (2019.01); *G06F 16/313* (2019.01); *G06F 16/332* (2019.01); *G06F 16/93* (2019.01); *G06N 3/006* (2013.01); *G06N 5/022* (2013.01)

(58) Field of Classification Search
CPC ......... G06F 17/30725; G06F 17/30616; G06F 17/30011; G06F 17/30637; G06F 16/381; G06F 16/93; G06F 16/313; G06F 16/332; G06N 3/006; G06N 5/022

USPC .................................................. 707/705, 758
See application file for complete search history.

(56) References Cited

U.S. PATENT DOCUMENTS

| | | | | |
|---|---|---|---|---|
| 5,793,966 A | * | 8/1998 | Amstein | G06F 40/166 709/203 |
| 6,189,019 B1 | * | 2/2001 | Blumer | G06F 16/954 715/205 |
| 6,438,566 B1 | * | 8/2002 | Okuno | G06F 16/93 715/233 |
| 6,632,251 B1 | * | 10/2003 | Rutten | G06F 40/56 715/205 |
| 6,658,623 B1 | * | 12/2003 | Schilit | G06F 16/30 715/208 |

(Continued)

OTHER PUBLICATIONS

"International Search Report and Written Opinion Issued in PCT Application No. PCT/US2019/021715", dated May 22, 2019, 13 Pages.

*Primary Examiner* — Hosain T Alam
*Assistant Examiner* — Robert F May
(74) *Attorney, Agent, or Firm* — Talem IP Law, LLP

(57) ABSTRACT

Author-created digital agents and content corpora for electronic documents are described. A content corpora service can include application programming interfaces such as for adding content to a corpus, attaching a corpus to a document, retrieving corpora associated with an author, and searching content of a corpus. An author-created digital agent can receive a request from a consumer of a document, determine corpora associated with the document, formulate a query based on the request, and search content associated with the corpora associated with the document.

16 Claims, 16 Drawing Sheets

(56) References Cited

U.S. PATENT DOCUMENTS

| | | | | |
|---|---|---|---|---|
| 8,086,557 | B2* | 12/2011 | Ait-Mokhtar | G06F 16/30 |
| | | | | 706/62 |
| 8,214,446 | B1* | 7/2012 | Siegel | H04L 51/00 |
| | | | | 709/207 |
| 2003/0050927 | A1* | 3/2003 | Hussam | G06F 16/904 |
| 2004/0216048 | A1* | 10/2004 | Brown | G06F 16/93 |
| | | | | 715/255 |
| 2006/0143195 | A1* | 6/2006 | Ornstein | G06F 40/103 |
| 2008/0005651 | A1* | 1/2008 | Grefenstette | G06F 16/30 |
| | | | | 715/234 |
| 2009/0157490 | A1* | 6/2009 | Lawyer | G06F 16/23 |
| | | | | 705/59 |
| 2011/0178981 | A1* | 7/2011 | Bowen | G06Q 10/00 |
| | | | | 707/608 |
| 2011/0219008 | A1* | 9/2011 | Been | G06F 16/00 |
| | | | | 707/742 |
| 2014/0143243 | A1* | 5/2014 | Kim | G06F 16/2457 |
| | | | | 707/728 |
| 2014/0201286 | A1* | 7/2014 | Kristensen | G06Q 10/10 |
| | | | | 709/204 |
| 2014/0304249 | A1* | 10/2014 | Ayzenshtat | G06F 16/9535 |
| | | | | 707/709 |
| 2017/0235835 | A1 | 8/2017 | Wang et al. | |

* cited by examiner

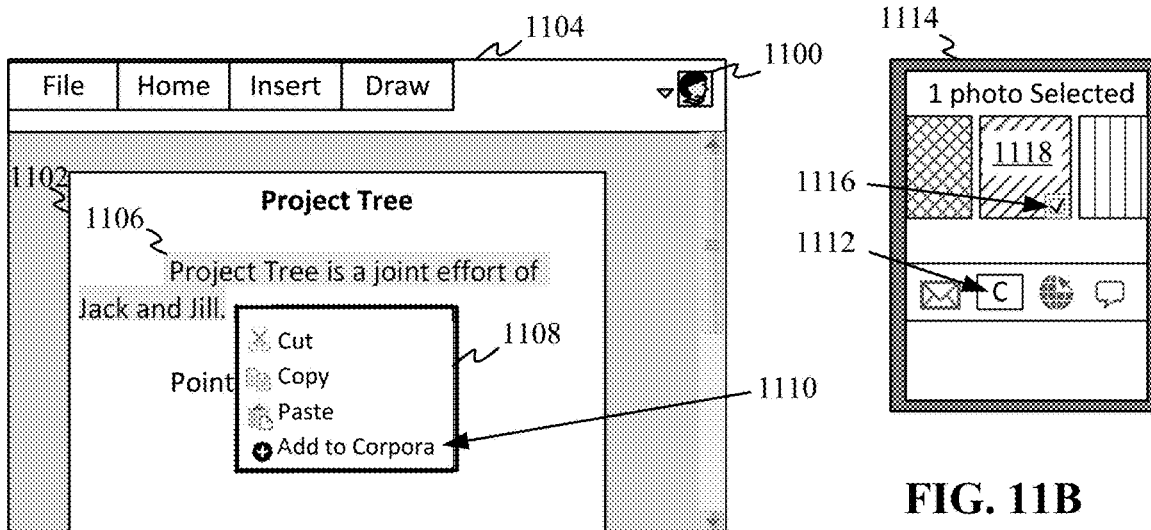
FIG. 11A
FIG. 11B
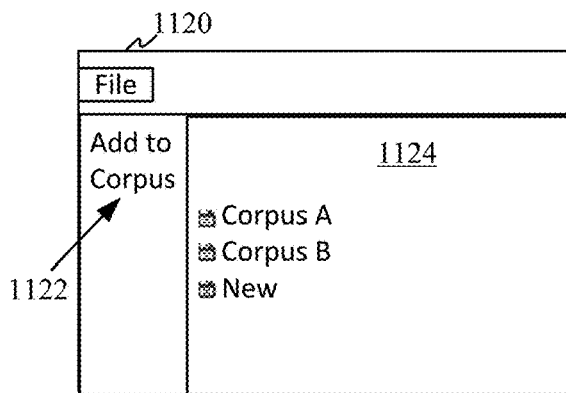
FIG. 11C
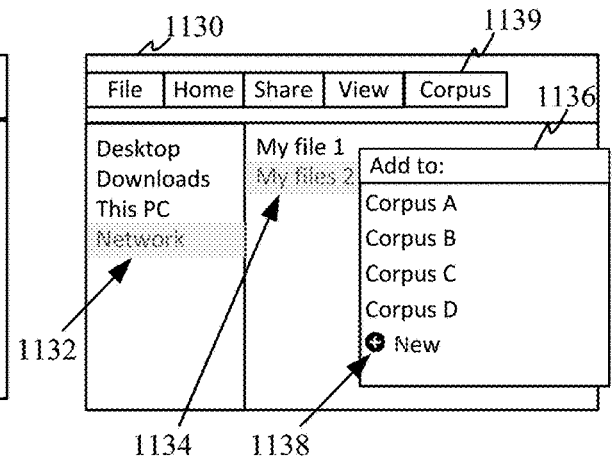
FIG. 11D
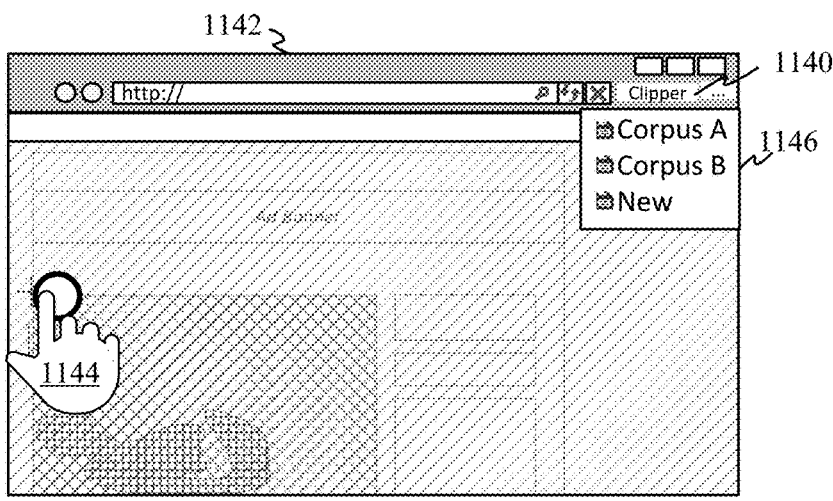
FIG. 11E
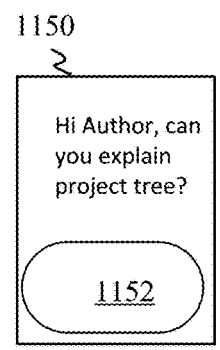
FIG. 11F

CONTENT CORPORA FOR ELECTRONIC DOCUMENTS

BACKGROUND

Electronic documents include any form of content that can be consumed by a user via a software application. Electronic documents include, but are not limited to, messages (e.g., an email file), portable document format files and word processing documents (usually referred to as "documents"), presentations, spreadsheets, web pages, and freeform content files (e.g., note pages and whiteboards).

When a document is consumed, it is up to the recipient to—in context—interpret the information presented by the author. The author is often not physically present or immediately accessible to answer questions or clarify a viewpoint. Instead, a content consumer must search for information from online resources or contact the author or other person for further information.

BRIEF SUMMARY

Author-created digital agents and content corpora for electronic documents are described.

An author-created digital agent is provided that, in response to receiving an implicit or explicit request of a consumer of a document, can determine corpora associated with the document, formulate a query based on the request, and search content associated with the corpora associated with the document using the query. An implicit request can be proactively generated by the digital agent to provide suggested content to the consumer. The implicit request can be generated by context of the consumer's interaction or lack of action with respect to the document and/or other signals with respect to a device, application, or consumer. The author-created digital agent can receive results of the search; provide the results of the search to the consumer; and determine whether the results include a result satisfying the request of the consumer. If the results do not include the result satisfying the request of the consumer, the author-created digital agent can prepare a message to an author of the document based on the query and communicate the message to the author. In response to receiving a response to the message from the author, the author-created digital agent can add the response to at least one of the corpora associated with the document.

A content consumer can, via a content consumption application, or via a separate application or feature, invoke an author-created digital agent. Once the author-created digital agent is initiated, the author-created digital agent can receive a request for a response regarding an author-created content. The author-created digital agent can identify, from the author-created content, a document identifier, a corpus identifier, an author identifier, or a combination thereof; determine corpora associated with the request; and search content in the corpora for content relevant to the request.

A content corpora service is provided that can include application programming interfaces such as for adding content to a corpus, attaching a corpus to a document, retrieving corpora associated with an author, and searching content of a corpus.

A content corpora service can manage a mapping data structure; receive a request to add content to one or more corpora; store or update a mapping of the content to the one or more corpora in the mapping data structure; receive a request to attach at least one of the one or more corpora to a document; and store or update a mapping of the at least one of the one or more corpora to the document in the mapping data structure.

A content creation application or author-created digital agent feature can communicate a request for a list of corpora associated with an author identifier to a corpus service, each corpus of the corpora associated with the author identifier comprising a set of curated, bound content. The application nor feature can receive, from the corpus service, the list of corpora associated with the author identifier; receive, from a user, a selection of a new corpus or at least one corpus of the list of corpora; and attach the new corpus or the at least one corpus to a document to create an author-created digital agent.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 11A-11F illustrate example scenarios of adding content to a corpus.

DETAILED DESCRIPTION

Figure 1A:
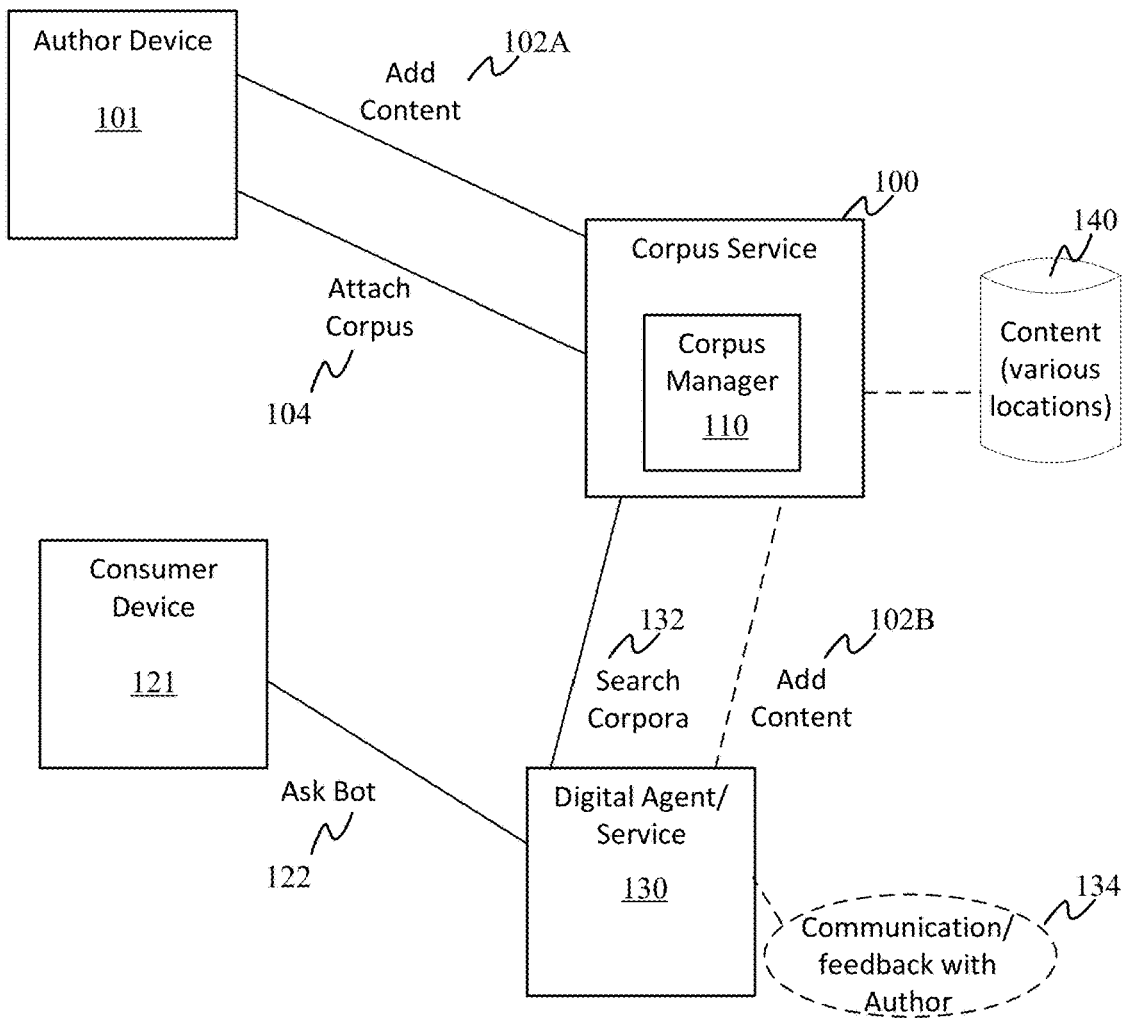
FIGS. 1A and 1B illustrate example operating environments.

Author-created digital agents and content corpora for electronic documents are described. The described features can provide a virtual author that can appear to travel with a document that allows the document's consumers to interact with an avatar of the author, or other interfaces, to delve into areas relevant to the content of the document without increasing the complexity of the document itself.

As used herein, "electronic documents" and "documents" are used interchangeably to refer to electronic documents of any type. As explained in the background, electronic documents include, but are not limited to, messages (e.g., an email file), portable document format files and word processing documents (usually referred to as "documents"), presentations, spreadsheets, web pages, and freeform content files (e.g., note pages and whiteboards). Documents provide a container for author-created content.

The author-created digital agents and content corpora for electronic documents can involve a hybrid intelligence. Hybrid intelligence, also referred to as hybrid-augmented intelligence, refers to the combination of human and machine intelligence, where both human and machine intelligence are used to address a problem. The hybrid intelligence can be used to train the artificial intelligence.

A digital agent can be a software agent that operates on behalf of an author or a computer/computational entity. In some cases, the digital agent can be a bot agent, or "bot". A "bot" is a term for a service. Some bots interact with users; other bots may perform automated functions for other applications. Conversational interfaces are commonly known as "chatbots" and, in some cases, virtual/digital assistants such as MICROSOFT CORTANA, APPLE SIRI, SAMSUNG BIXBY, AMAZON ALEXA, and GOOGLE ASSISTANT may be considered to be a form of a chatbot or bot. Bots can communicate and otherwise interact with users using text, cards, speech, and even images. Bots can have varying levels of complexity from a simple pattern matching for response to a complex integration with existing services, providing business logic, natural language understanding, and other services. The described author-created digital agents may be implemented as part of a bot framework environment such as described with respect to FIG. 10, where the author-created agents are author-created bots that reside as services supported by the bot framework. In other cases, the described author-created digital agents may be implemented as part of an independent service. Accordingly, an author-created digital agent may refer to the service called by a document (or by a content consumption application) when a content consumer is interacting the with document. Author-created digital agents are provided in a manner that reduces or removes the need of the author to understand the complexity of agent/bot creation. In some cases, an author-created digital agent can be created on a user's behalf through a scaffolded interaction (e.g., a model by which the action is demonstrated, repeated, and/or supported) with an interface of another application (such as a content creation application).

An "avatar" refers to the visual representation of a digital agent; and may include images, video, and audio. Avatars may be used to convey emotion, action, and movement. In some cases, a digital agent can include visual, audio, and even tactile representations. In some embodiments, the described author-created digital agents may not include an avatar and instead utilize other interfaces.

The described author-created digital agents utilize one or more corpora associated with a document to generate information for the consumer of the document. Other than the content provided in response to a request by the content consumer, the complete contents associated with the one or more corpora are themselves opaque to the consumer. The pieces of content and files associated with a particular one or more corpora can change over time, as a result of requests of the content consumer (and responses given by author), the active adding and removing of associated content by the author, and learned activities of the author (e.g., where the author-created digital agent learns from the author's behavior and activities to add content to one or more of the author's corpora).

In some cases, associations may change over time as a result of changes in behavior, signals, or content exterior to the document(s) to which a corpus is attached. For example, there may be changes in related documents, changes based on signals around people behavior (e.g., meetings), or changes based on improvements to learning models. In some cases, author-created digital agents and/or the content corpora can be modified and improved using deep learning from sources indicating relationships between users and content. For example, the author-created digital agent may leverage content and interactions identified by sources associated with the author that can be found on social or professional networks (e.g., FACEBOOK, LINKEDIN), and enterprise graphs (e.g., MICROSOFT OFFICE GRAPH) to provide recommendations on content that can be added to a corpus and recommendations on corpora to be added to a document.

To an author-created digital agent, a document has at least one bounded and curated corpus of content from which additional information can be obtained. This bounded, curated corpus can be updated directly by an author or indirectly, such as via artificial or hybrid intelligence. Because the corpus is bounded, the number of resources required to be searched is minimized, in some cases, reducing power consumption and bandwidth requirements of the computing systems on which content is being consumed. Because the corpus is curated, the content being searched will be most relevant to the query, which is particularly useful in cases where terminology used in the document may have multiple meanings outside of those intended by the author and/or where code names or terms are used that are specific to that author or enterprise.

Figure 1B:
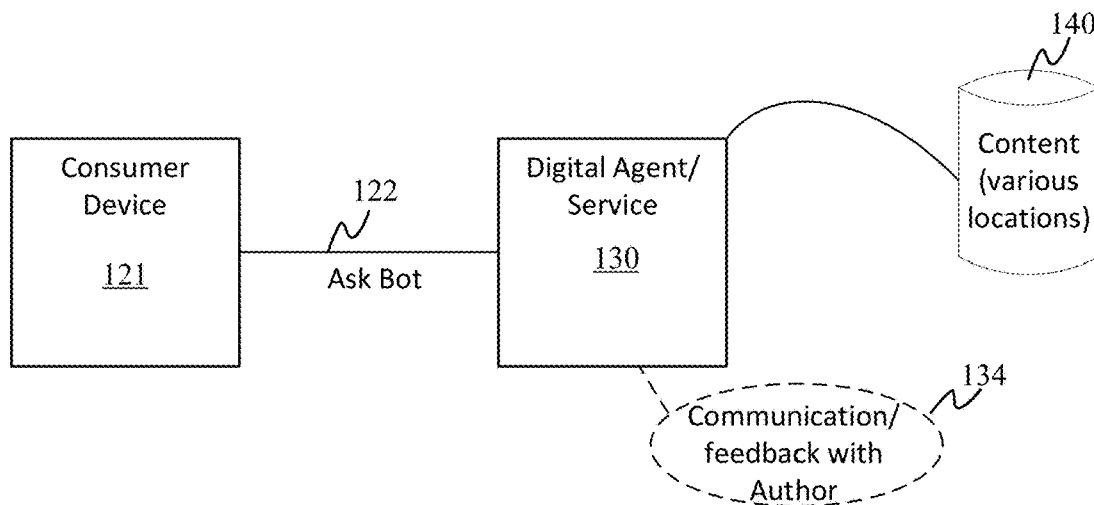
Figure 2:
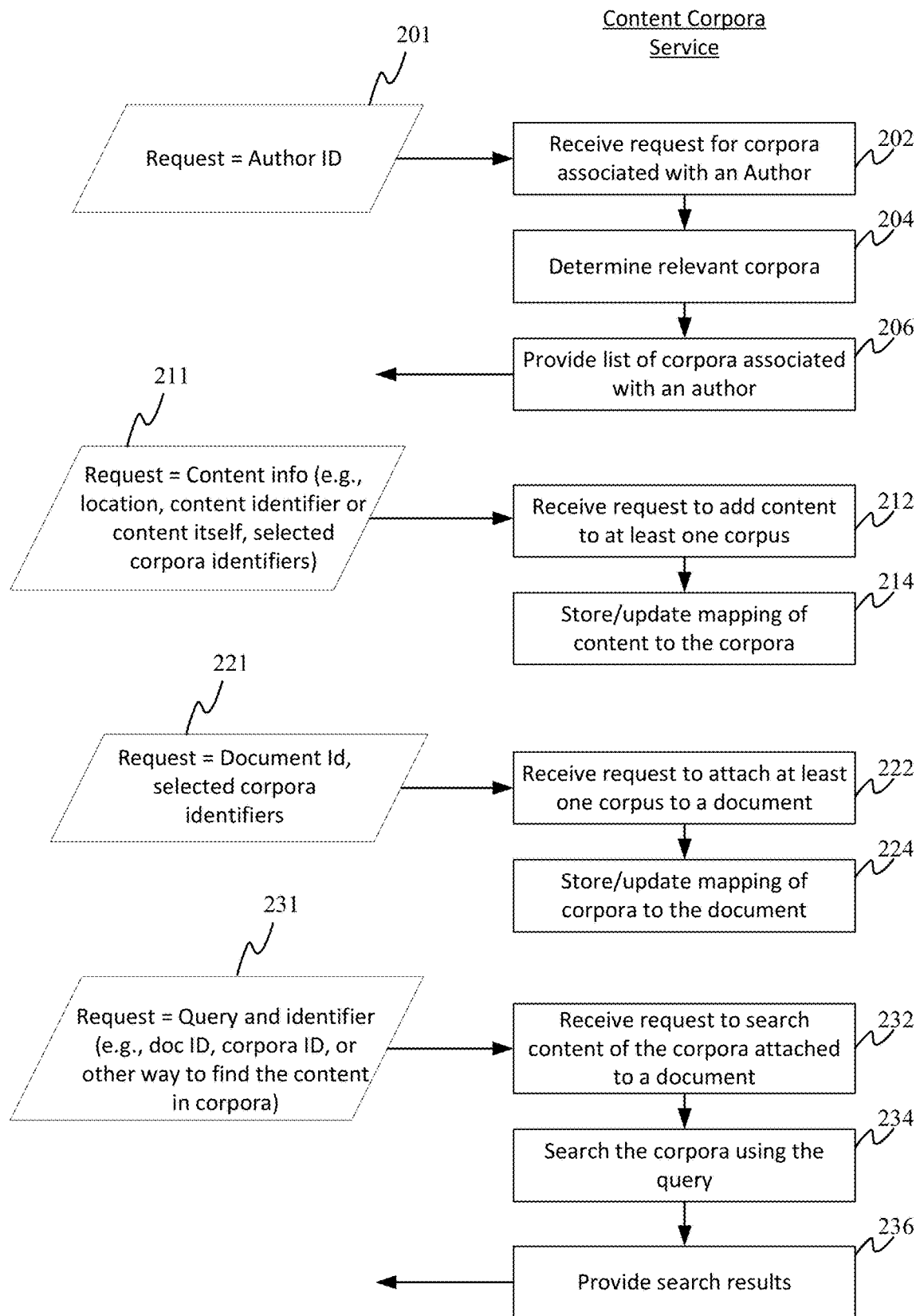
FIG. 2 illustrate processes that may be carried out by a corpus service.

FIGS. 1A and 1B illustrate example operating environments; and FIG. 2 illustrate processes that may be carried out by a corpus service. Referring to FIG. 1A, in the example operating environment, a corpus service 100 can include application programming interfaces (APIs) that support author-created digital agents. An author device 101 can communicate with the corpus service 100 via the APIs. For example, the author device 101 can add 102A contents to a selected corpus. In addition, the author device 101 can attach 104 a particular corpus to a document. At the corpus service 100 a corpus manager 110 can, in response to receiving requests via the APIs to add 102A and attach 104 from, for example, an author device 101, manage the relationships between content, files, corpora, and documents.

A corpus manager, such as corpus manager 110, can manage the mappings of corpora to the documents they support and to the content that forms them. The corpus manager can be part of a corpus service with application programming interfaces for adding content to a particular one or more corpora and attaching one or more corpora to a particular document. Author-created digital agents can access the corpus service to identify the appropriate resources to search. In some cases, the author-created digital agents can include or access intelligence that can automate adding (and removing) content to the corpora, such as when an answer to a request is not found in the existing content and when content indicated as part of a corpus is interacted with (by the author or others). In some cases, an author-created digital agent may be configured to reference content external to the corpora. In one of such a case, the author-created digital agent may have permissions to access information from the web, from other documents, or from other authors.

A consumer at a consumer device 121 can consume, via a content consumption application, a document that the author, for example at the author device 101, has attached a corpus.

A "content consumption application" refers to any application in which content can be consumed (e.g., by viewing or listening). In some cases, content consumption applications include editing functionality and may include content creation applications. Examples of content consumption applications include document viewers (e.g., a PDF viewer), email applications, reader applications (e.g., e-book readers), presentation applications, word processing applications, web browser applications, audio players (spoken audio and music), video players, notebook applications, and whiteboard applications.

When the consumer is consuming the document at the consumer device 121, the consumer is able to delve deeper into the document than what is shown by using a gesture that accesses digital agent service 130 to utilize information from the attached corpora, as reflected by the communication to ask 122 a digital agent. The gesture that accesses the digital agent service 130 can initiate the digital agent and may include communicating with a bot framework and/or executing a script in the document file or the metadata of the document. In some cases, parts of digital agent service 130 may be local (e.g., at the consumer device 121) and parts of digital agent service 130 may be executed at a server. For example, some common questions or commands may be served locally by the parts of digital agent service 130 at the consumer device. The digital agent, via digital agent service 130, can search 132 the attached corpora by communication (e.g., via one or more APIs) with the corpus service 100. If the answer is not available in the attached corpora, then the digital agent service 130 may communicate feedback with the author 134. In some cases, the digital agent service 130 can take the response from the author and add that response to one of the authors corpora via, for example the add content API 102B. In some cases, the digital agent service 130 can provide the response from the author to the consumer in a subsequent surfacing of the interface to the author-created digital agent. In some cases, the digital agent service 130 may provide a notification to the consumer that a response to the message from the author is available.

In some cases, the author can consume their own document and access service 130 to utilize information from their own attached corpora. In some of such cases, the author may use the digital agent to help create new content (that may or may not reuse pieces of existing content).

In addition to adding content to corpora and attaching corpora to documents, it is possible for the author (or an application that the author is using) to obtain information on their available corpora and the content they have already added to the corpora. For example, as shown in FIG. 2, a request including an author ID 201 can be received by the content corpora service 202. Based on the author ID, the content corpora service can determine relevant corpora 204. The relevant corpora can be provided as a list to the source of the request. In some cases, a corpora request can be associated with a group of authors instead of just a single author. In some of such cases, a group identifier may be used. In other of such cases, multiple author identifiers are communicated with the request. The list of corpora may be used when an author is trying to add content to a corpus, as well as when an author is trying to attach corpora to a document.

For example, as further illustrated in FIG. 2, when the author would like to add content to one of their corpora, a request 211 including content information (for example, a content identifier, a location, and/or the content itself) and the selected corpora identifier can be communicated to the content corpora service. The content corpora service receives the request to add content to at least one corpus 212. The content corpora service can use the information from the request to store or update mapping of content to the corpora 214.

In addition to adding content to a corpus, an API is available for attaching particular corpora to a document. As shown in FIG. 2, a request to attach one or more corpora to a document 221 can include a document ID, and selected corpora identifiers. The content corpora service can receive the request to attach at least one corpus to a document 222; and store or update 224 the mapping of the corpora to the document. The storing of content to corpora and the corpora to a document can be managed by the content corpora manager 110.

In some cases, the content corpora service can receive a request 231 to search content of the corpora attached to a document (232). The request 231 can include a query and an identifier, for example, a document ID, corpora ID, or other identifier that can be used to find content in corpora (e.g., as described with respect to FIGS. 8A-8C). The content corpora service can search the corpora using the query (234) and provide the search results to the source of the request (236). The source of the request may be the author-created digital agent, which further serves the search results to the consumer application and/or more directly in a bot window or bot application. In some cases, the results are provided to a bot service, a third party service, or via an API. The query received with the request may be from explicit query search terms initiated by the user or implicit search terms initiated by the user or implicit search terms generated on behalf of the user by the digital agent, the service, a different digital agent or service, or a third party.

FIG. 1B illustrates a simplified example operating environment. Referring to FIG. 1B, a different back-end may be used to support an author-created digital agent. For example, the digital agent service 130 may manage an index of corpora or a mapping data structure and search and traverse the data structure to identify appropriate corpora and search the content contained therein. A consumer at the consumer device 121 can consume author-created content in a document that has the attached corpora. When the consumer is consuming the document at the consumer device 121, the consumer is able to delve deeper into the document than what is shown by using a gesture that accesses digital agent service 130 to utilize information from the attached corpora, as reflected by the communication 122 to ask a digital agent. In some cases, instead of an explicit action such as the gesture, an implicit request can be generated and communicated to the digital agent service 130. The implicit request can be based on context of the consumer's interaction or lack of action with respect to the document and/or other signals with respect to a device, application, or consumer (e.g., device information, application information, consumer information). The digital agent, via digital agent service 130, can determine the corpora associated with the document, formulate a query based on the request from communication 122, and search content 140 associated with the corpora.

As with the case described with respect to FIG. 1A, if the answer is not available from the content in the attached corpora (or otherwise indicated as not satisfying the request of the consumer), then the digital agent service 130 may communicate feedback 134 with the author. In some cases, content (determined to be relevant to the request) is provided in response to the request from the consumer and the author-created digital agent can determine whether the content includes a result satisfying the request of the consumer by an explicit question (e.g., "does this answer your question?") or by an implicit determination (e.g., due to consumer continuing to ask repeated questions).

Figures 3A, 3B:
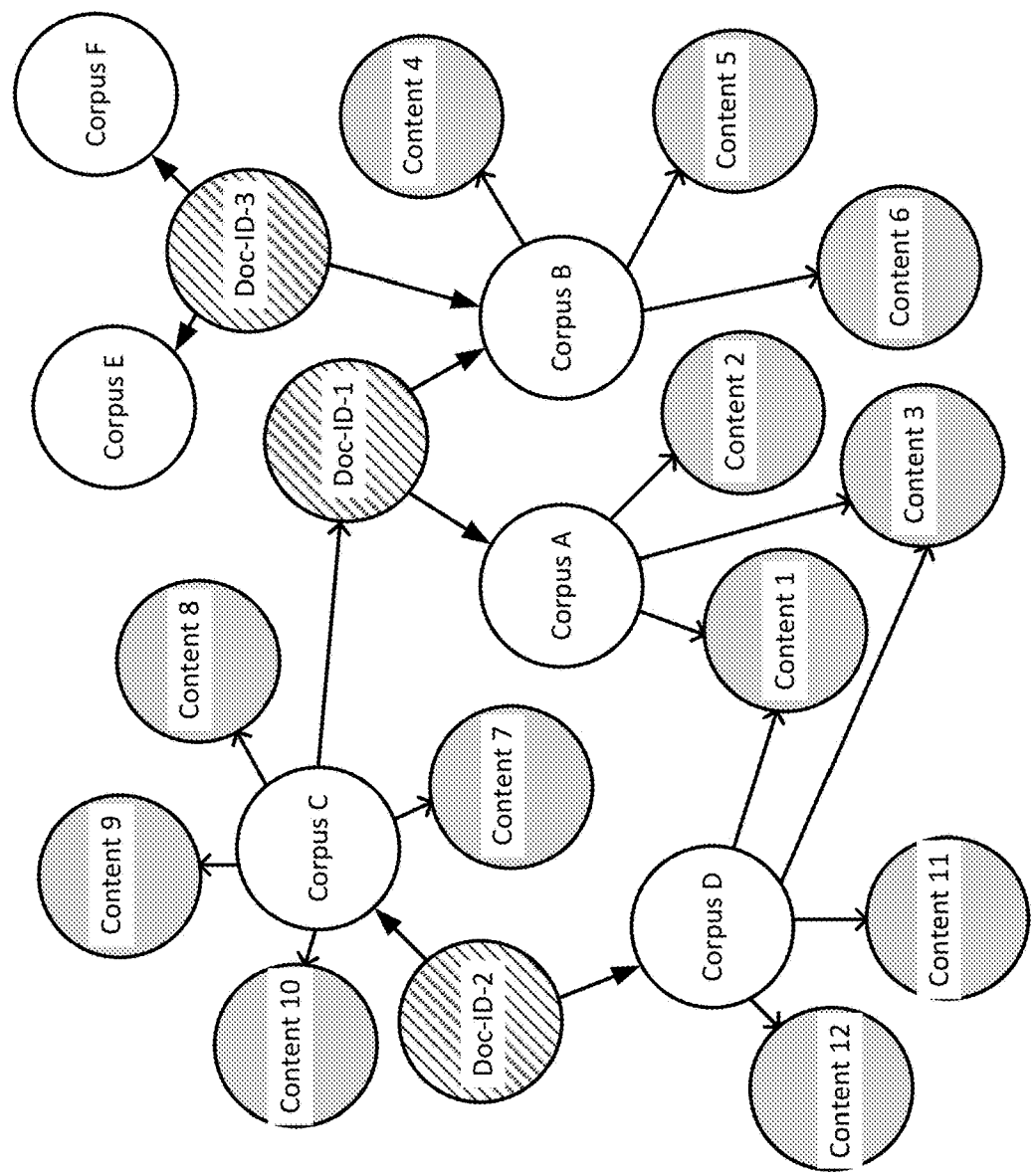
FIGS. 3A and 3B illustrate example mapping data structures that may be managed by a corpus manager.

FIGS. 3A and 3B illustrate mapping data structures that may be used to map the content corpora. In the illustrated scenario of FIGS. 3A and 3B, four corpora are shown: corpus A is shown with content 1, content 2, and content 3; corpus B has content 4, content 5, and content 6; corpus C has content 7, content 8, content 9, content 10, and even a document that itself has a corpus attached, Doc-ID-1; and corpus D has content 1, content 3, content 11, and content 12. Although the content nodes may be presented to a system as unique nodes, in some implementations, the nodes may be algorithmically collapsed based on, for example machine learning or other patterns or identifiers, thereby increasing the number of times multiple documents point to the same content. The arrangement of the nodes can affect the manner of traversal.

Also shown is the mapping between a document and its attached corpora. Here, a first document (Doc-ID-1) is shown having corpora A and B attached thereto. A second document (Doc-ID-2) is shown having corpora C and D attached thereto. A third document (Doc-ID-3) is shown having corpora B, E, and F attached thereto. As can be seen from the mapping, the same content can be included in different corpora, multiple corpora can be attached two different documents, and documents having themselves attached corpora can be included in another corpus. The content in the corpora can be indicated by an identifier and location. For example, content 1 can be located at URL A, content 2 can be located at URL B, content 3 can be located at URL C, content 4 can be located at URL D, content 5 can be located at URL E, content 6 can be located at URL F, content 7 can be located at URL H, content 9 can be located at URL I, content 10 can be located at URL J, Doc-ID-1 can be located at URL K, content 11 can be located at URL L, and content 12 can be located at URL M.

In some cases, content can be physically located across different corpora. In some cases, content at the nodes are indicated as links (e.g., uniform resource identifiers). The content itself may be stored separately. Multiple copies may be provided or the content can be stored in an optimized manner.

Although not shown, other mappings may be included in the mapping structure, including aspects of a social graph, enterprise graph, or other information that may be desired to be associated with content, corpora, and documents. For example, in some cases, the graph can include nodes representing authors, the graph further providing a mapping of corpora to the authors who created or contributed to them. The mapping to the authors may be direct or indirect, such as through the mapped documents (e.g., building on a document graph).

The attaching of a corpus or one or more corpora to a document can be considered to attach an author-created digital agent to a document. One or more of a document identifier, corpus identifier, and/or author identifier may be stored as part of a document's metadata. In some cases, script can be included in the metadata of the document in order to facilitate the creation of the author-created digital agent.

An author-created digital agent can determine the corpora associated with the document being consumed by the user; and, using one or more queries formulated based on the intent of the user, search the content of the corpora.

The content of a corpus that is associated with a document is intended to not be visible in its entirety to a consumer of the document. That is, a user consuming the document is not provided the entirety of the corpora and may never know what is all in a particular corpus. A content corpus and data structure enables an author to associate content to a document such that the content is not visible in its entirety to a consumer of the document. The opaqueness leads to the fact that even though a document itself may contain a certain amount of content, the information contained within the document (based on the attached corpora) can be nearly infinite in large graph systems. A digital agent or other intermediary can intelligently serve up content from corpora associated with the document while the document itself can be an abbreviated or minimal file size.

Figure 4:
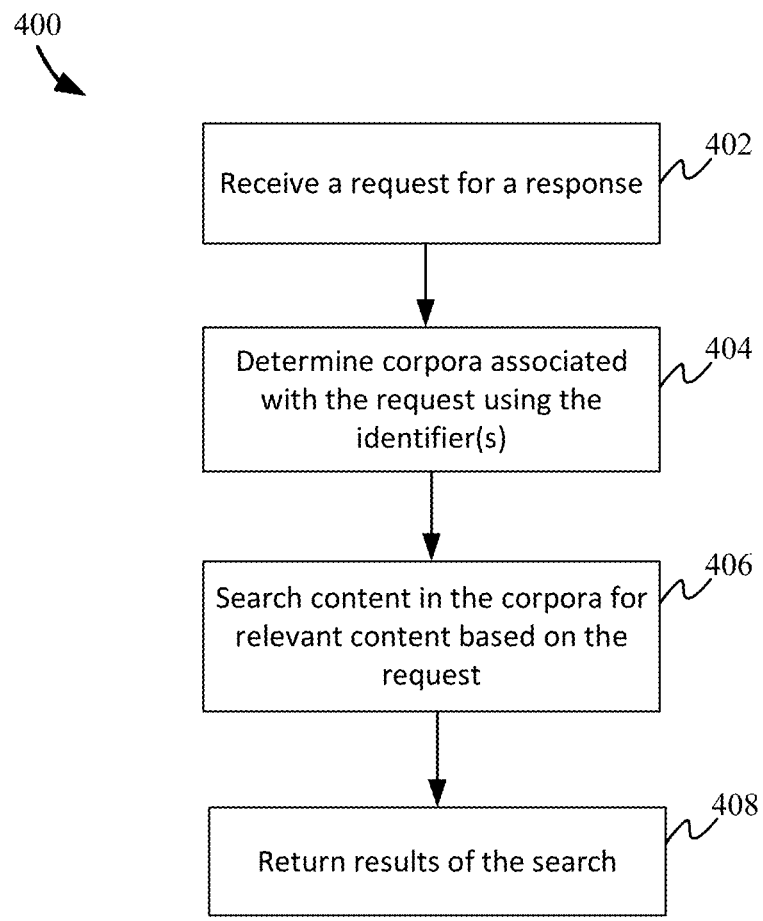
FIG. 4 illustrates a process flow of an author-created digital agent.

FIG. 4 illustrates a process flow of an author-created digital agent. Referring to FIG. 4, an author-created digital agent can receive (402) a request for a response. The request can be considered to include an intent of a user. The intent of the user can be an explicit or implicit intent for information about the author-created content of the document being consumed. In some cases, the intent can be determined by the author-created digital agent or by an intent determination service. In some cases, the digital agent can receive a natural language statement or question about the content. The request for the response can also include information associated with the document that is used to identify the corpora containing the set of curated, bound content from which the author-created digital agent obtains results. The information used to identify the corpora can include a document identifier, a corpus identifier, an author identifier, or some other suitable identifier or identifying information that can be used to find the content in the attached corpora. In response to receiving the request, the author-created digital agent can determine corpora associated with the request using the identifier(s) (404). From the corpora associated with the author-created content, a search of the content in the corpora can be conducted for content relevant to the request (406). The results of the search can be returned to the source of the request (408).

An author-created digital agent can be invoked in a variety of ways. In some cases, a command or menu item may be provided. In some cases, the author-created digital agent can be invoked due to an action or inaction of the user. Once invoked, the author-created digital agent can be initiated, including the surfacing of an avatar or interface in preparation for receiving a request for a response (e.g., an intent of the user with respect to content in the document). The intent of the user can be indicated by a selection of a term, sentence, image, or other amount or type of content. In some cases, intent may be derived from non-selection context, including, but not limited to, location, device (e.g., type of device, model, etc.), application (e.g., version, type, etc.), content of the document/file, metadata, permissions, sharing status/sharing history, or contacts. Any of these context for intent may be used by the digital agent to generate the request (and/or query). In some cases, initiation of a digital agent involves calling a digital agent service with a digital agent identifier of the author-created digital agent. In some cases, as part of the initiation of the author-created digital agent or in response to receiving the request for a response, information, such as the document identifier, corpus identifier, author identifier, or a combination thereof, can be identified from the document.

Figure 5A:
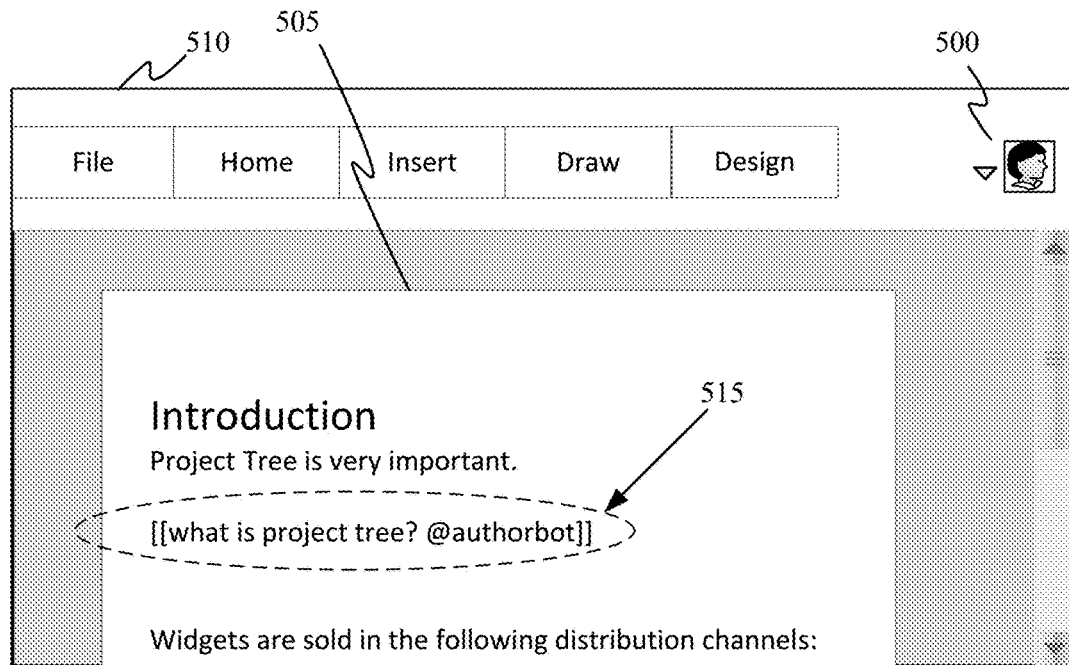
FIGS. 5A-5F illustrate example scenarios of invoking an author-created digital agent.
Figure 5B:
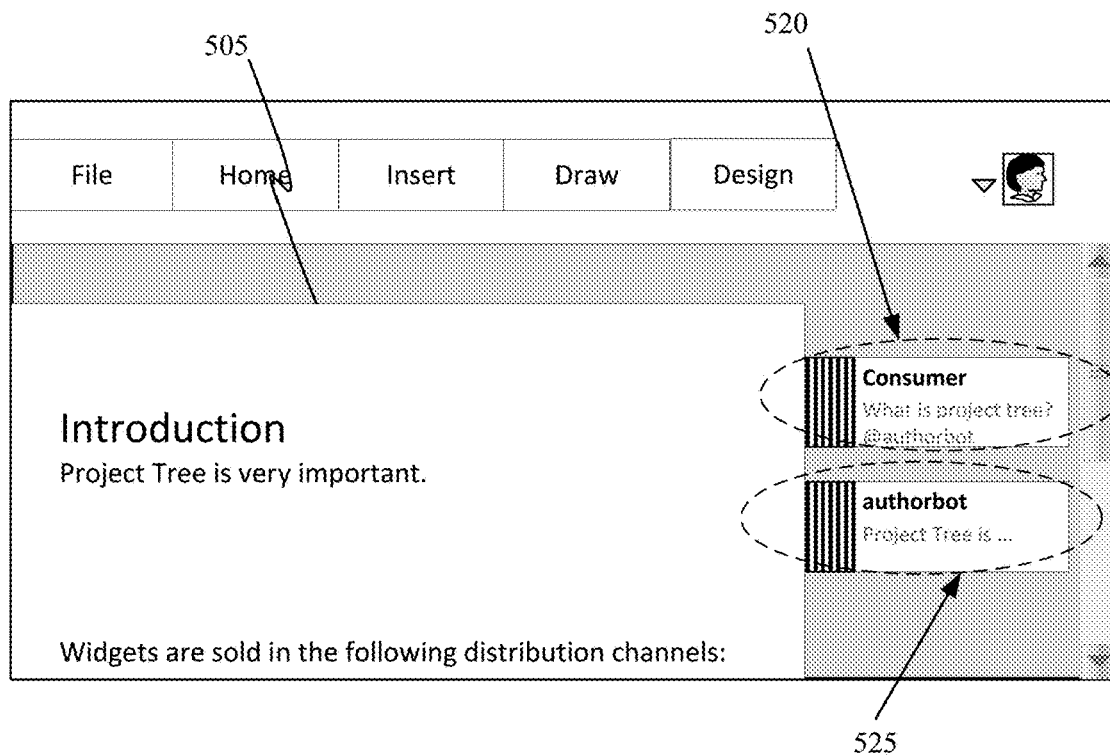

FIGS. 5A-5F illustrate example scenarios of invoking an author-created digital agent. Referring to FIGS. 5A and 5B, a user may invoke the author-created digital agent using an inline note or @mention. For example, "@mentions" can be used in email, notes, and comments to direct comments to the author-created digital agent. For example, a consumer (e.g., represented by icon 500) may be consuming author-created content in a document 505 displayed using a content consumption application such as word processing application 510 (which is also a content creation application). As shown in FIG. 5A, the consumer can enter an inline note 515 into the body of document 505 with an @mention of "@authorbot" to invoke the author-created digital agent. As shown in FIG. 5B, the consumer may instead invoke the author-created digital agent by using an @mention in a comment 520 of the document 505. In some cases, the response by the author-created digital agent may also be surfaced in the comments, such as shown in comment 525 of FIG. 5B.

Figure 5C:
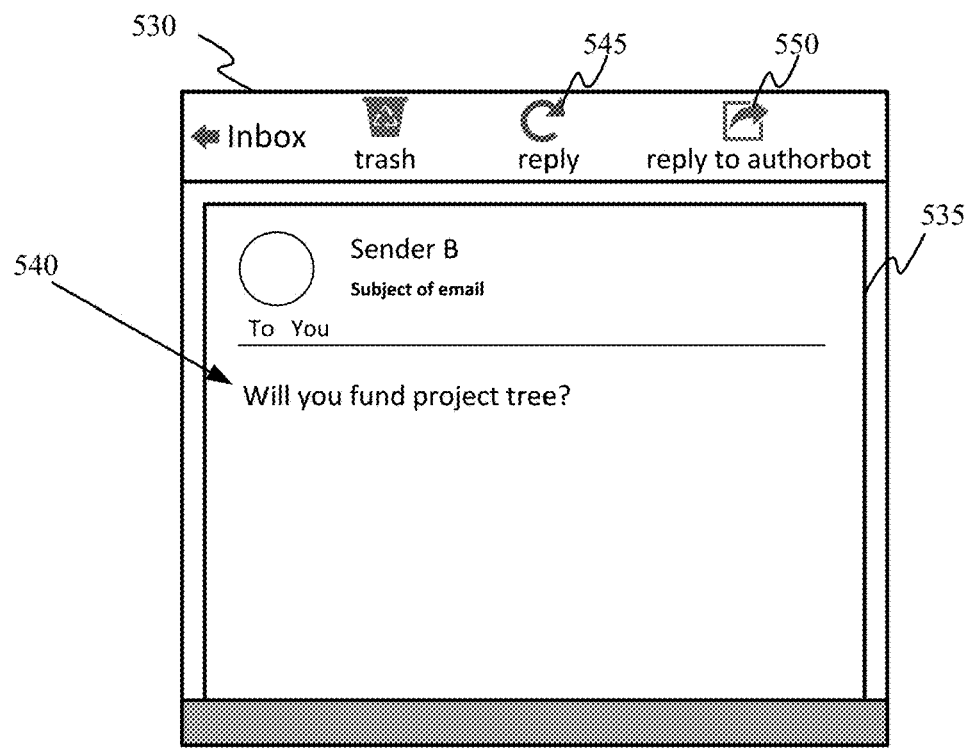

Referring to FIG. 5C, a user may invoke the author-created digital agent from within an email application 530. For example, when viewing an email item 535 with a message containing author-created content 540, the consumer may select to reply to the sender (e.g., via command 545) or to send a message to the author-created digital agent (e.g., via command 550), invoking the author-created digital agent. In some cases, the user may directly email the author-created digital agent using, for example, a unique email address or a general email address that can be used by the receiving service to identify the appropriate author-created digital agent.

Figure 5D:
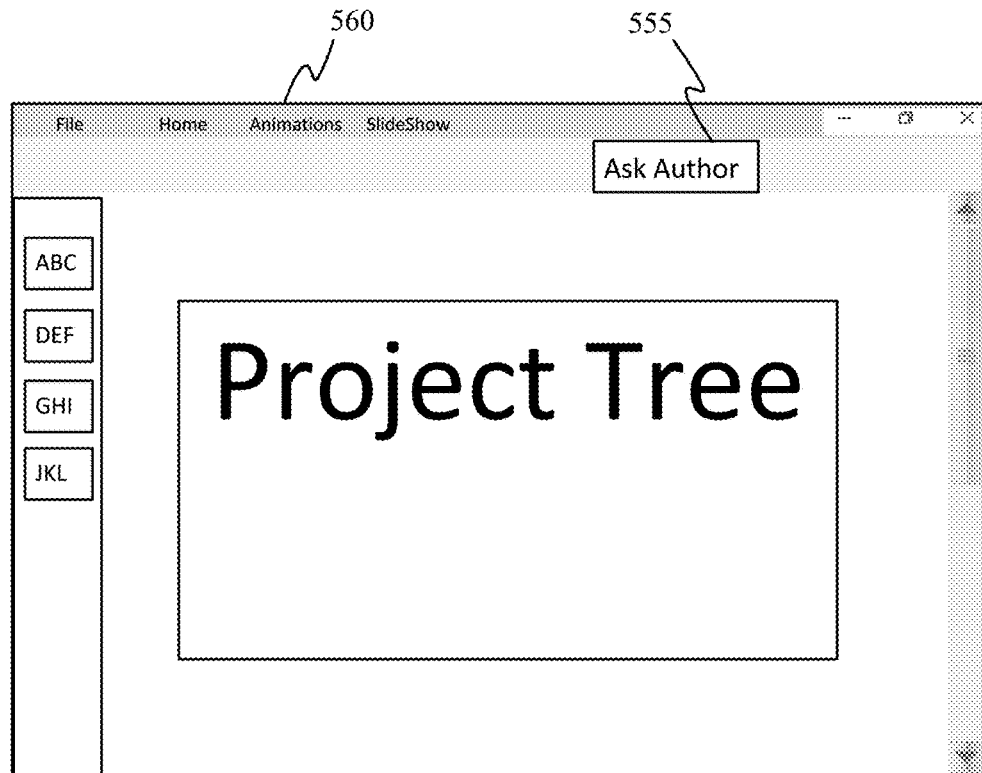
Figure 5E:
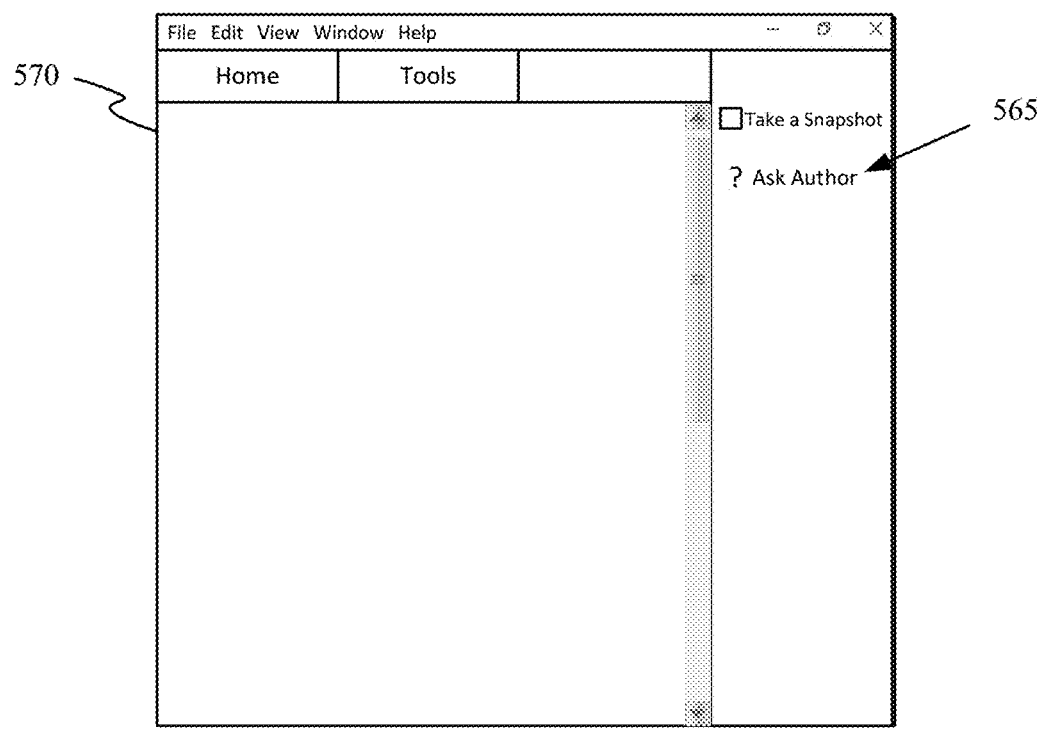

Referring to FIGS. 5D and 5E, a user may invoke the author-created digital agent from a search bar or invoke digital agent command. For example, as shown in FIG. 5D a search bar field 555 of a content consumption application can be used to invoke the author-created digital agent. In this illustrative example, the content consumption application is a presentation application 560. In the example of FIG. 5E, a tool bar command 565 of a content consumption application may be used to invoke the author-created digital agent. In this illustrative example, the content consumption application is a PDF viewer 570.

Figure 5F:
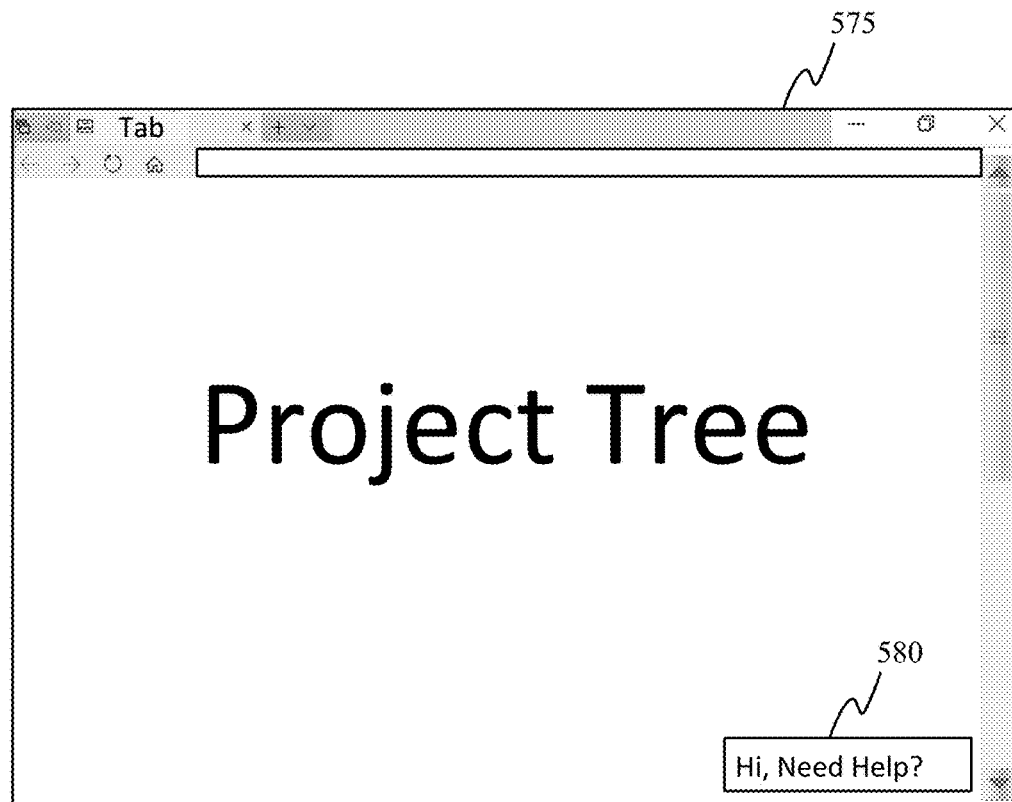

Referring to FIG. 5F, a user may invoke the author-created digital agent while in a web browser 575 and viewing author-created content of a web page. In the illustrative example, a chatbot 580 can surface in the display of the web browser or in a separate window, for example, as a result of the consumer being on the page for a period of time without interaction. The chatbot 580 can provide an interface to the author-created digital agent.

Of course, other scenarios are contemplated. For example, a user of a personal digital assistant such as APPLE SIRI or MICROSOFT CORTANA may invoke the author-created digital agent by asking the personal digital assistant to contact an author-created digital agent.

As mentioned above, the author-created digital agent may leverage other services for analyzing and interpreting the intent. In addition, the author-created digital agent may leverage search services for support in formulating queries based on the intent.

Figure 6:
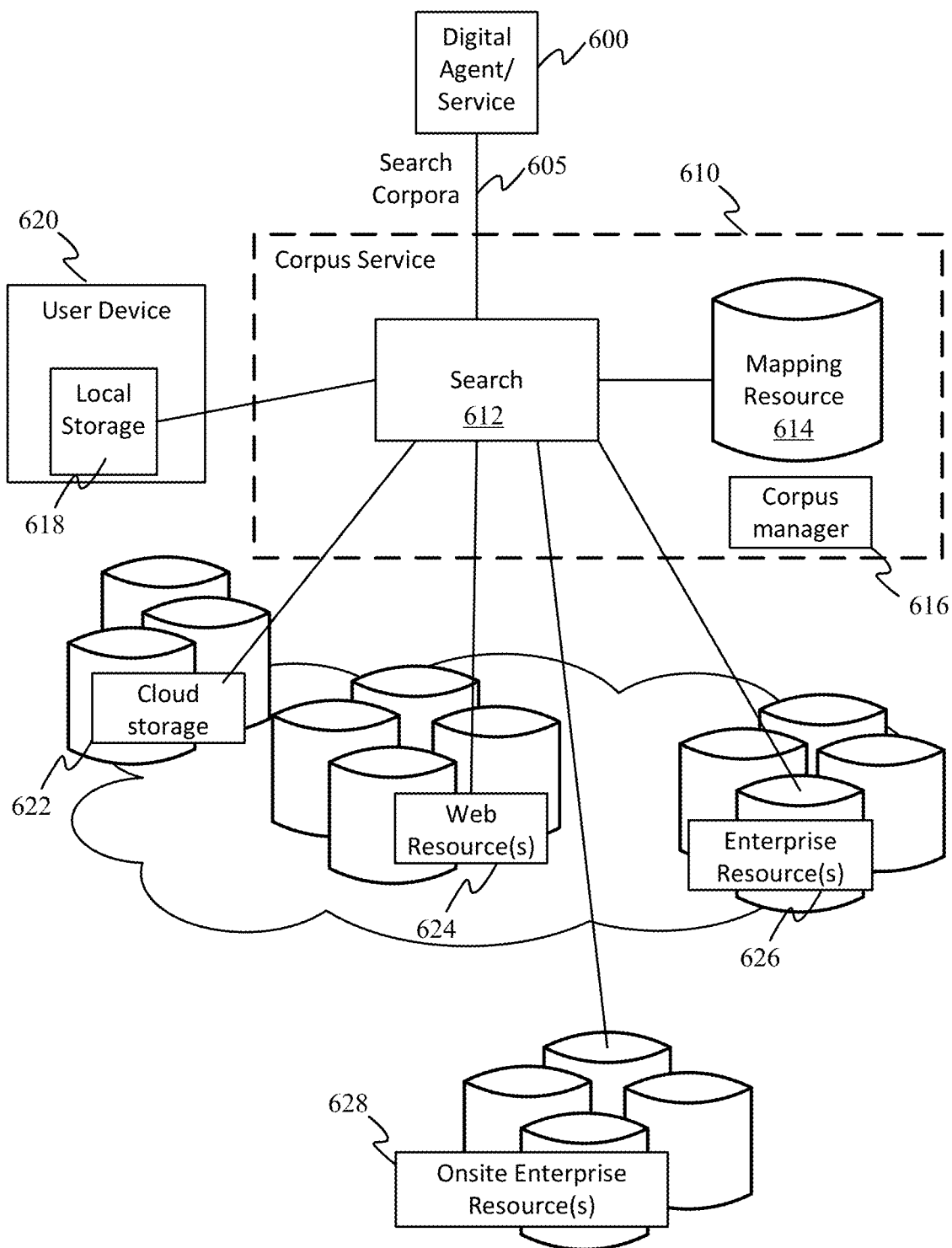
FIG. 6 illustrates an example service architecture for an author-created digital agent.

FIG. 6 illustrates an example digital agent service architecture for an author-created digital agent. Referring to FIG. 6, an author-created digital agent 600 can, as mentioned with respect to FIG. 1A, perform a search of corpora attached to a document via communication (e.g., communication 605) with a corpus service 610. The corpus service 610 can include a search service 612, which may or may not communicate with mapping resource 614 and corpus manager 616, in order to access content identified as being part of a corpus. The content may be located on a local storage 618 of a user device 620, in cloud storage 622, on a web resource 624, on a cloud enterprise resource 626, or an onsite enterprise resource 628. If the answer is not available in the content of the attached corpora, then the digital agent service 600 may communicate feedback with the author as mentioned with respect to FIG. 1B.

Figure 7A:
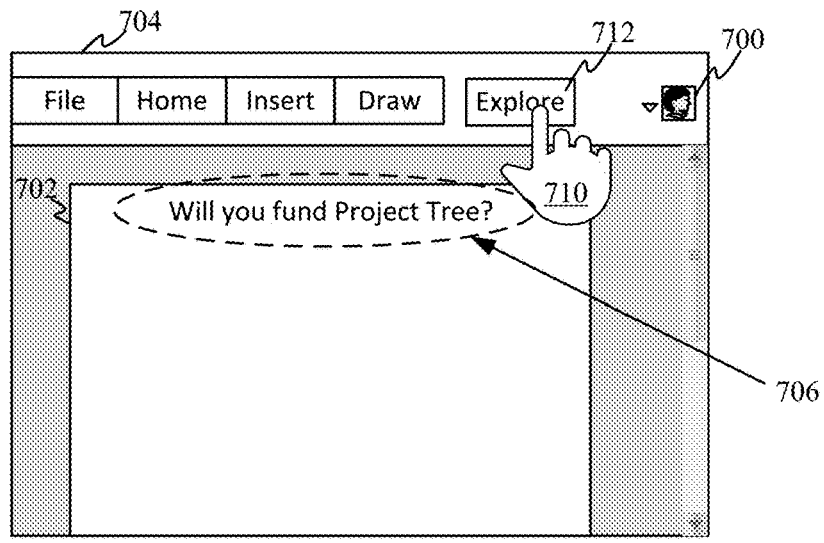
FIGS. 7A-7C illustrate an example scenario of an author-created digital agent.
Figure 7B:
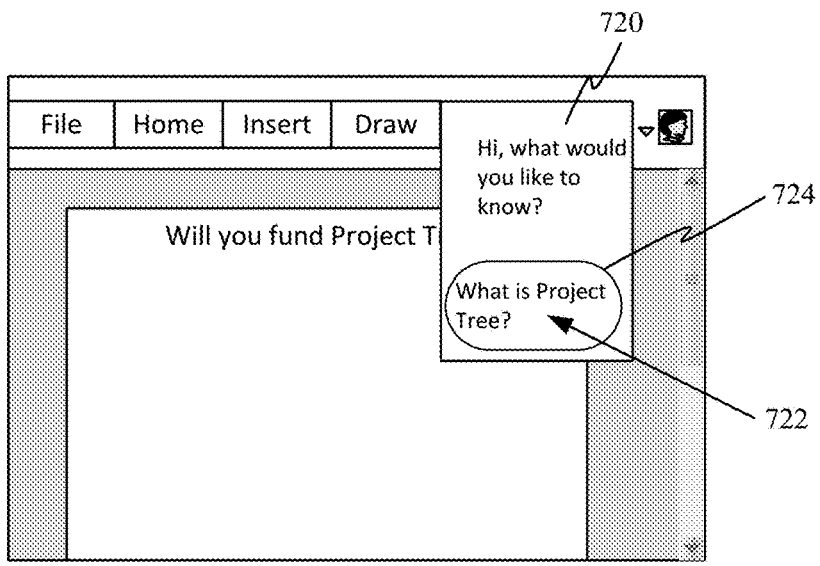
Figure 7C:
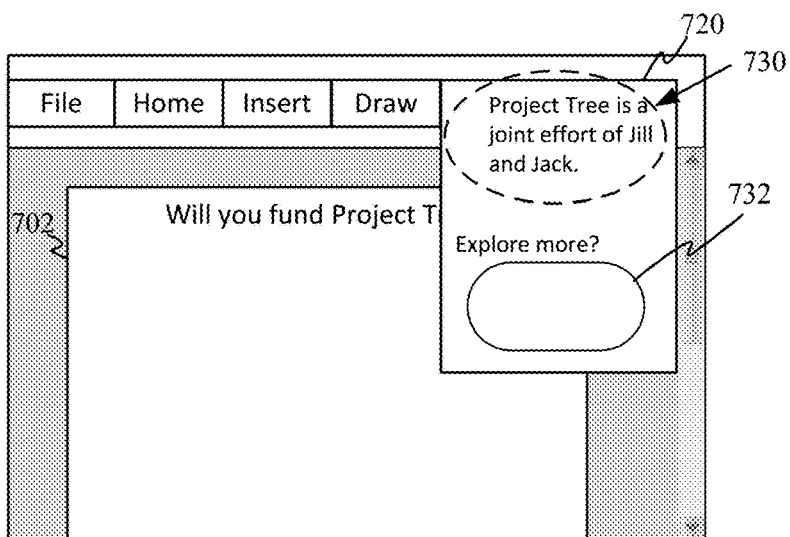

FIGS. 7A-7C illustrate an example scenario of an author-created digital agent. Referring to FIG. 7A, a consumer (e.g., indicated by icon 700) may be viewing a document 702 in a content consumption application 704.

Returning to FIG. 7A, document 702 may include the question "will you fund project tree?" 706. In some cases, the consumer may know what project tree is and be able to respond or otherwise consume the document. In other cases, the consumer may not know or may have questions that they would like to ask the author. In such a case, the consumer may perform a gesture to access the author-created digital agent. Here, a gesture of selection (710) of an "explore" command 712 is used. As shown in FIG. 7B, in response to receiving the explore command the author-created digital agent may instantiate and a chat box 720 may open. Here, the consumer enters "what is project tree?" 722 in an input field 724. The question may be entered by an explicit statement (e.g., via typing or speaking the question) or may be inferred by selection of the content in the document, as some examples. The author-created digital agent can then, in some cases, operate as described with respect to FIG. 1. In more detail, as shown in FIGS. 8A-8C, information at the document can be used by the digital agent service to access the appropriate information.

As shown in FIG. 7C, results from the search of content in the author's corpora can be rendered in the digital agent interface. For example, in the illustrative scenario, the author may have included an FAQ file in a corpus attached to the document 702 and the digital agent returns the answer 730 of "Project Tree is a joint effort of Jill and Jack" as provided by the author. The digital agent interface can allow for continued interaction (e.g., via input field 732) for additional questions by the consumer. Although a bot window/chat box 720 is shown, the digital agent interface may be an avatar. In addition, although input fields 722, 732 are shown, any suitable input mechanism (e.g., verbal or other natural user interface) may be used. In some cases, the digital agent may display in a window or screen separate from the content consumption application and may even be displaying on a separate device. In some cases, instead of a conversational bot, the interface can be a graphical user interface that represents the content of the interaction (e.g., the questions and answers) in a way that is more document-like.

Figure 8A:
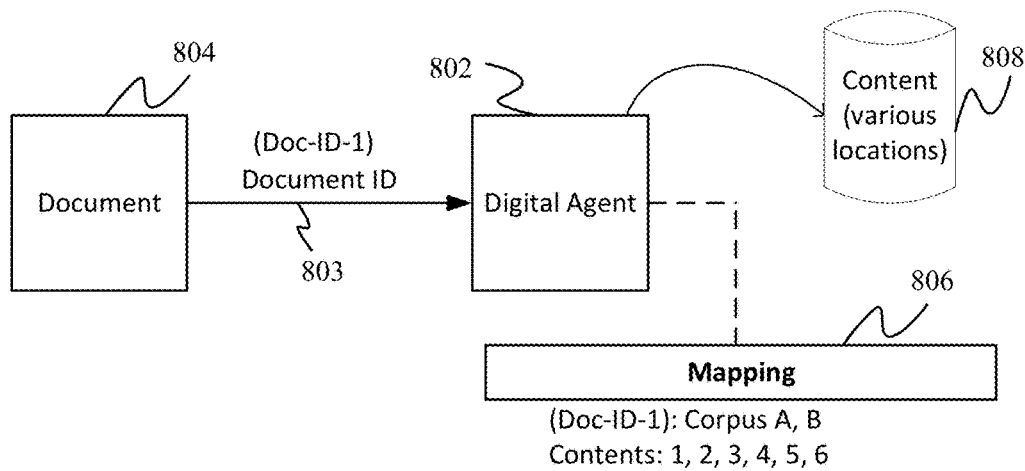
FIGS. 8A-8C illustrate example representations of an author-created digital agent.
Figure 8B:
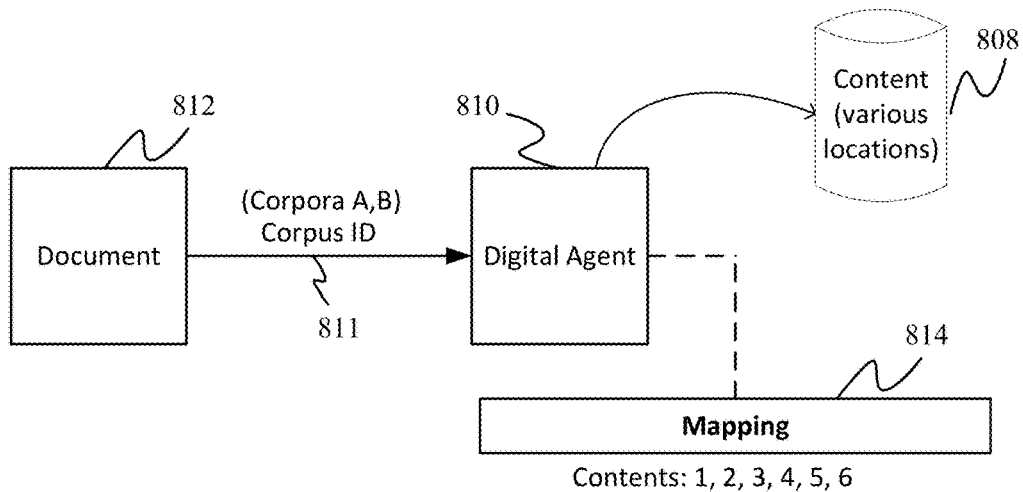
Figure 8C:
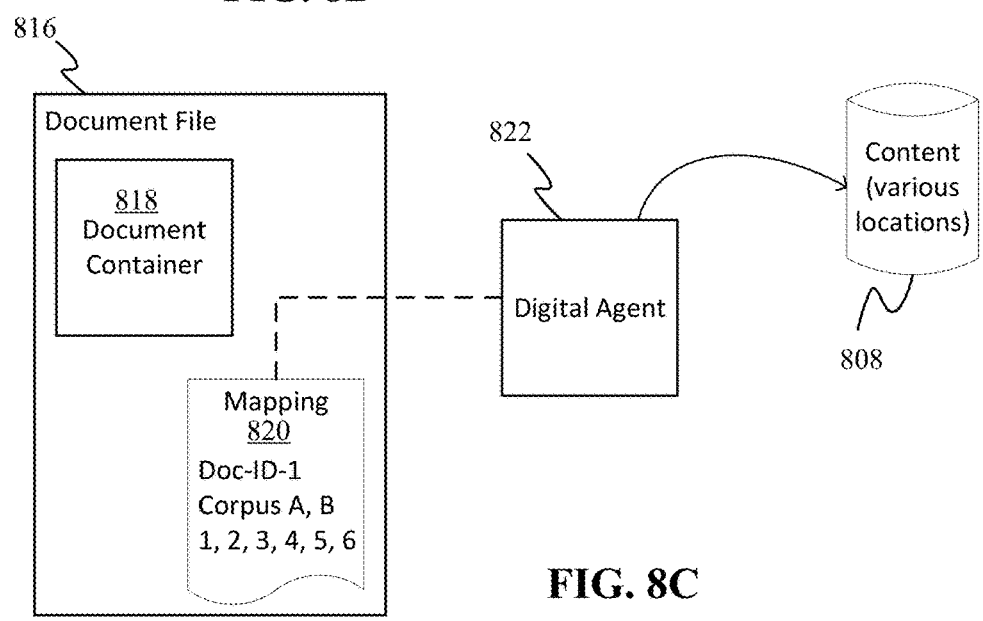

FIGS. 8A-8C illustrate example representations of an author-created digital agent; and FIGS. 9A-9D illustrate example processes that may be carried out by an author-created digital agent. In the example illustrated by FIG. 8A, the digital agent 802 can use the document identifier 803 of the document 804 to determine the content to search. For example, the document identifier 803 can be used to access a mapping 806 (which may be managed by a corpus manager) indicating the corpora attached to the document 804 and, thus, the content to be searched. The content 808 may be stored at various locations. The document identifier 803 may be the name of the document, a part of the name of the document, or may be a string or other value stored as part of the metadata of the document. As an illustrative example, with reference to the mapping information illustrated in FIGS. 3A and 3B, the document 804 may have a document identifier 803 of "Doc-ID-1". The digital agent 802 can use the document identifier to access the corpus service, which indicates the mapping of the Doc-ID-1 to corpora A and B; and the mapping of the corpora to their contents 1, 2, 3, 4, 5, and 6. In the illustrated scenario, the author-created digital agent may perform process 900, including receiving a document identifier with a request for a response (902); determining corpora associated with the document identifier (904); identifying content associated with the corpora (906); and searching the content associated with the corpora for content relevant to the request (908).

In some cases, the document 804 may include both a document identifier and identifiers of any attached corpora. In other cases, the document 804 only includes a document identifier. In some cases, both the document identifier 803 and an author identifier (which may also be part of the document's metadata) are used to determine the attached corpora.

In the example illustrated by FIG. 8B, the digital agent 810 can use the document corpus identifier(s) 811 of the document 812 to determine the content to search. For example, the corpus identifier(s) 811 can be used to access a mapping 814 (which may be managed by a corpus manager) indicating the content to be searched. The content 808 may be stored at various locations. The corpus identifier(s) 811 may be a string or other value stored as part of the metadata of the document. In some cases, a corpus identifier includes identification of the author. As an illustrative example, with reference to the mapping information illustrated in FIGS. 3A and 3B, the document 812 may have corpus identifiers 811 of "Corpora A, B". The digital agent 810 can use the corpus identifiers to access the corpus service, which indicates the mapping of the corpora to their contents 1, 2, 3, 4, 5, and 6. In the illustrated scenario, the author-created digital agent may perform process 910, including receiving one or more corpora identifiers with a request for a response (912); identifying the one or more corpora corresponding to the one or more corpora identifiers (914); identifying content associated with the corpora (916); and searching the content associated with the corpora for content relevant to the request (918).

In some cases, the document 811 may include both a document identifier and identifiers of any attached corpora.

In the example illustrated by FIG. 8C, the document is in the form of a document file 816. The document file 816 includes a document container 818, which provides the elements of the document that the document file's consumption application may put together to display the content of the document. For example, a presentation document may be in the form of document file 816, with the slides and the content of the slides contained as part of the document container 818. In this example, a mapping 820 indicating the content of the corpora attached to the document file 816 can be part of the document file 816. As an illustrative example, with reference to the mapping information illustrated in FIGS. 3A and 3B, the document file 816 can include the mapping of the Doc-ID-1 to corpora A and B; and the mapping of the corpora to their contents 1, 2, 3, 4, 5, and 6. In the illustrated scenario, the author-created digital agent may perform process 920, including determining a set of curated, bound content that is associated with a document being consumed (922); and searching the content for content relevant to the request (924). Here, the determining of the set of content to search is performed by using the mappings (or index) indicated in the document file 816.

Thus, a digital agent 822 can access the mapping 820 from the document file 816 to identify the content 808 that can be searched. Of course, as mentioned above, the content 808 can be stored at various locations.

As mentioned above, mappings 806, 814, and 820 may take the form of the structures described with respect to FIGS. 3A and 3B. In some cases, the author-created digital agents 802, 810, 822 use a search service to query the resources having the identified contents. The search service may be part of or in communication with the corpus service (see e.g., 612 described in more detail with respect to FIG. 6).

Figure 9A:
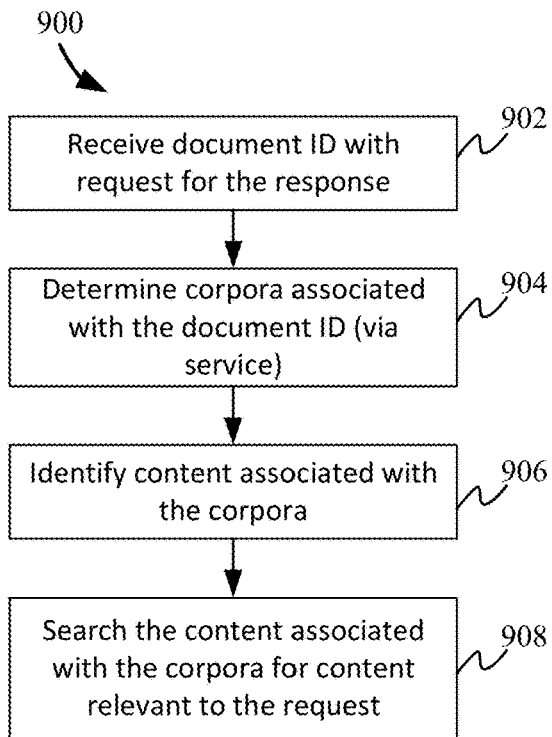
FIGS. 9A-9D illustrate example processes that may be carried out by an author-created digital agent.
Figure 9B:
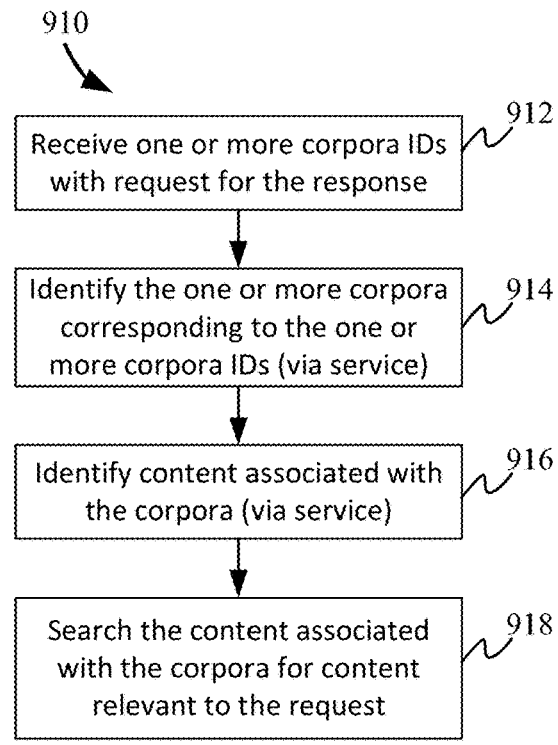
Figure 9C:
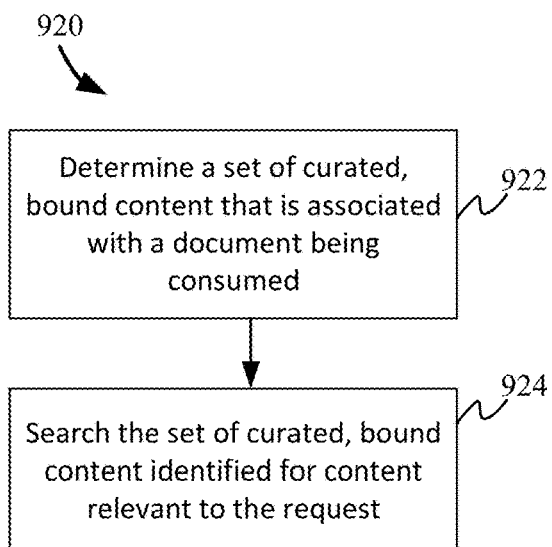
Figure 9D:
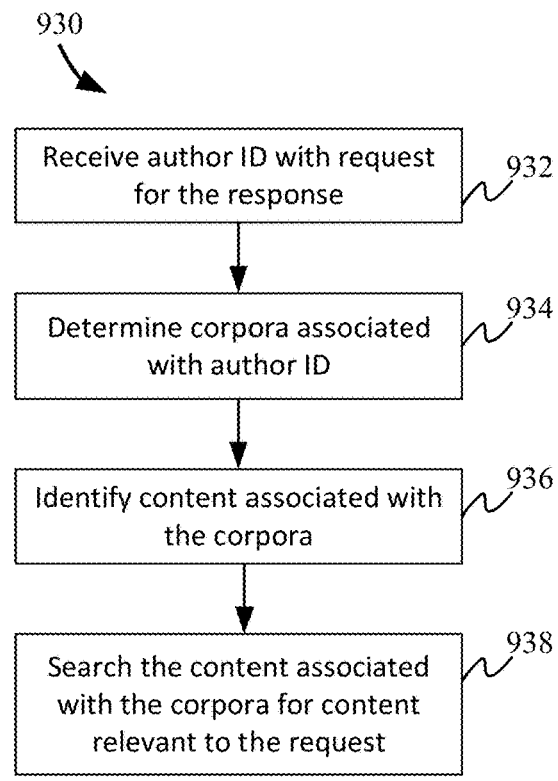

In some cases, the document includes an author identifier instead of or in addition to the other identifiers used by the digital agent to determine appropriate content to search. In some of such cases, as shown in FIG. 9D, the author-created digital agent can perform process 930, including receiving an author identifier with a request for a response (932); determining corpora associated with the author identifier (934); identifying content associated with the corpora (936); and searching the content associated with the corpora for content relevant to the request (938).

Figure 10:
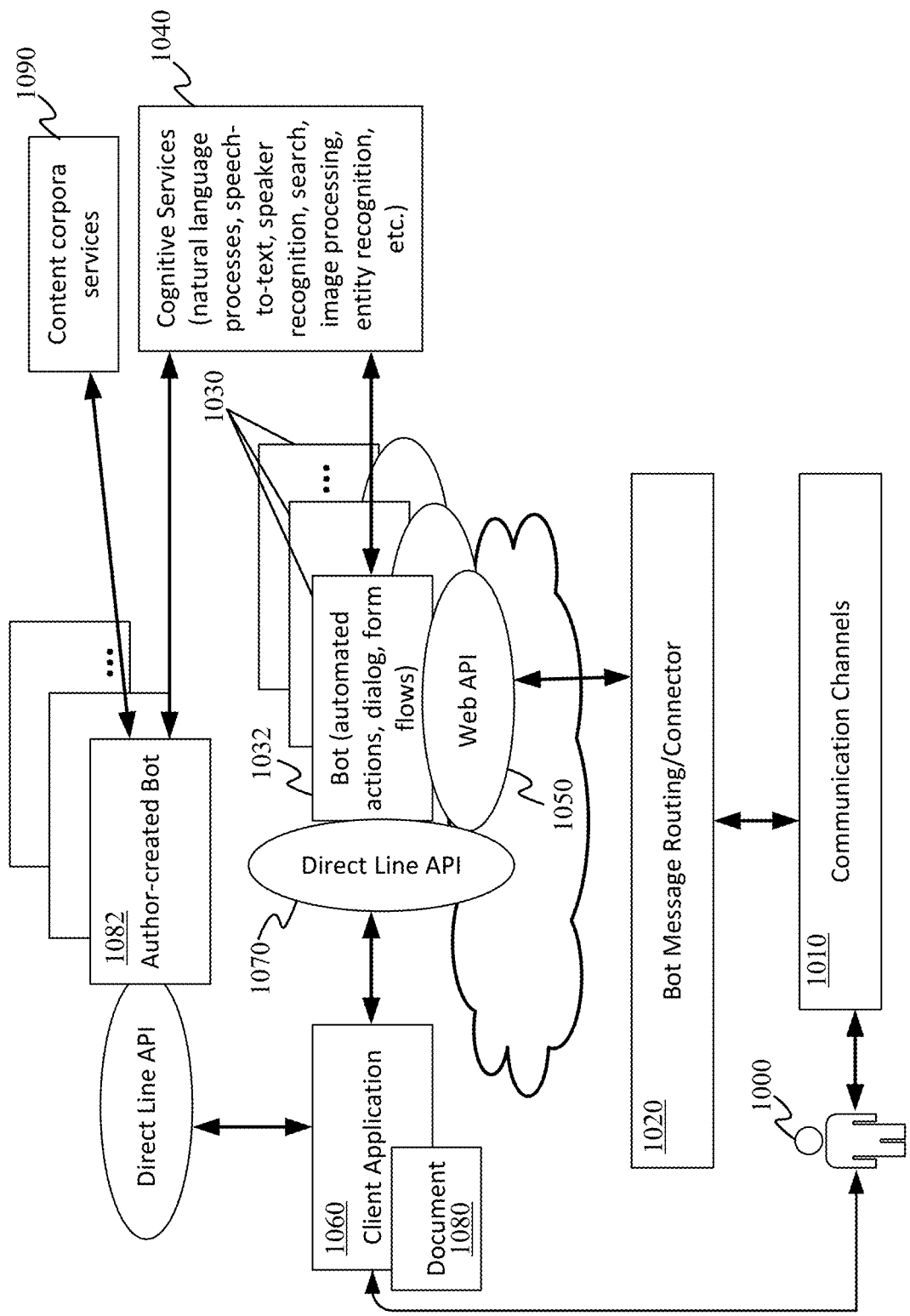
FIG. 10 illustrates an example bot framework environment.

FIG. 10 illustrates an example bot framework environment. Referring to FIG. 10, a user 1000 can interface with a digital agent that is part of the bot framework over any communication channel 1010 including, but not limited to, group channel conversation, group chat, instant message, web chat, and even email or SMS text conversation. The bot frame work includes a bot message routing/connector 1020 that supports the communication over the various communication channels 1010 and routes messages to an appropriate bot of the known/registered bots 1030, for example, bot 1032. The bots 1030 can access a variety of cognitive services 1040 to support various features such as natural language processes, speech-to-text, speaker recognition, search, image processing, entity recognition, translation, and other features.

Communication with bot 1032 may be via the bot's web API 1050 or, in some cases, such as when the user 1000 is within a client application 1060, the communication with bot 1032 may be via the bot's direct line API 1070. The communication between client application 1060, and bot 1032 can thus be carried out in a more conventional client/service configuration. When user is consuming document 1080, and bot 1032 is an author-created bot, such as author-created bot 1082, the bots access services such as the content corpora services 1090.

Other services can leverage the author-created digital agent. For example, personal digital assistants or other bots can provide the user interface to the author-created digital agent. A content consumer may ask Siri or Cortana a question regarding content they are viewing or listening to. The personal digital assistant may pass the question to the author-created digital agent or perform one or more of the processes carried out by the author-created digital agent (and/or a bot framework in which the author-created digital agent operates).

FIGS. 11A-11F illustrate example scenarios of adding content to a corpus.

Authors may use content creation applications to create content. The content created by authors can be shared with others in a variety of ways and consumed by content consumers.

Content creation applications are software applications in which users can create content in digital form. Examples of content creation applications include, but are not limited to, note-taking applications such as MICROSOFT ONENOTE and EVERNOTE, freeform digital canvases such as GOOGLE JAMBOARD and MICROSOFT Whiteboard, word processing applications such as MICROSOFT WORD, GOOGLE DOCS, and COREL WORDPERFECT, presentation applications such as MICROSOFT POWERPOINT and PREZI, as well as various productivity, computer-aided design, blogging, and photo and design software. Content consumers may use content creation applications, communication applications (e.g., email, messaging applications, and the like), reader applications, and even web browsers to consume content.

Authors can, while within a content creation application, or via other tools, select content and files to add to one or more corpora. Authors can select content that the authors themselves did not create to add to one or more of their corpora. Authors can, while within a content creation application, other application, or via other tools, select to attach one or more corpora to a document. The attaching of a corpus to a document refers to the conceptual relationship between a corpus and a document, but may also include the attachment of metadata to the document as well as the more abstract understanding that a corpus is to be associated with a document for use by an author-created digital agent. The creation of the author-created digital agent can occur at the time that a first corpus is attached to a document. This may be in the form of code added to the document metadata, which itself can call a bot or other service identified by the document metadata or can be used by an application in which the document can be consumed (a "content consumption application") to call the bot or other service identified by the document metadata.

Referring to FIG. 11A, an author (e.g., identified by icon 1100) may be creating content in a document 1102 at the author device using a content creation application 1104. In this example the author has decided to add content (e.g., highlighted text 1106) from the document 1102 to one of their corpora. Here, some, but not all of the content in the document is being added to the corpora. In this illustrative scenario, the user may have access a menu 1108 to add content to a corpus by a gesture bringing a context menu 1108 and selection of an "add to corpora" command 1110. Selecting the command 1110 can, in some cases, communicate request 201 to the content corpora service to retrieve a list of the author's corpora; and then upon selection of one or more corpora, communicate request 211.

Referring to FIG. 11B, photographs can be added to a corpus, for example, via mobile image sharing. In the illustrated example, a corpus icon 1112 can be provided in a photo application 1114 so that a user can select (e.g., indicated by selector 1116) a photograph 1118 stored on the user's mobile device.

FIG. 11C illustrates a scenario in which the whole file is added to a corpus. In this example, a user of a content creation application 1120 may access a command menu for adding content to a corpus 1122. Selecting the command menu for adding content to a corpus 1122 may communicate the request 201 to the content corpora service to retrieve a list of the author's corpora (shown in display area 1124). In some cases, upon selection of one or more corpora, the application 1120 can communicate request 211 to the content corpora service to add the file to the appropriate one or more corpora.

FIG. 11D illustrates another scenario for adding content to a corpus. In FIG. 11D, a file explorer window 1130 may be available with a command to add a file to a particular one or more corpora. For example, a user may be exploring files located on a network 1132, and select a file (e.g., file 1134).

A contextual menu 1136 may be available that includes command icons to add the file to one or more corpora 1138. In some cases, a ribbon or toolbar menu 1139 for corpora-related actions (not shown) may be available for the file explorer window 1130.

It should be understood that although menus are shown for initiating the process flow for adding content to corpora, other mechanisms for invoking the add content to corpora API are contemplated. For example, content may be added to one or more corpora upon save (either automatically based on default settings or manually as an option during an automatic or manual save action).

FIG. 11E illustrates a scenario where content may be captured into a corpus using a clipper feature 1140 (which may be an add-on to a web browser 1142 or stand-alone app as some examples). In the example of FIG. 11D, a user may select 1144 content displayed in a window (e.g., of a web browser 1142) and select one or more corpora from a list 1146. In some cases, the selection of the clipper 1140 communicates a request 201 for the user's corpora. In some cases, the request 201 may be sent after selection of content in the window. Of course, other implementations are contemplated. A variety of clipping features may also be incorporated in the sending to or "adding" a clipping to one or more corpora.

FIG. 11F illustrate an example interface 1150 and input field 1152 that a digital agent service may present to the author when, for example, the digital agent service was unable to find a proper response in the existing content of the author's corpora. The digital agent request may be via communication channels, and application, or a chat box.

The examples illustrated in FIGS. 11A-11F reflect explicit adding of content to a corpus. Implicit requests to add of content to a corpus can also be identified to facilitate adding of content to a corpus. For example, instead of a command to add content to a corpus, a content creation application may automatically provide suggested corpora to add the document to upon detecting that a user has finished contributing to a document. In some cases, suggested one or more corpora may be presented based on context (e.g., user ID, enterprise/organization, topic(s)). In some cases, instead of suggesting one or more corpora based on context, the content may be automatically added to the corpora identified based on the context. As another example, automatic adding to a corpus can be performed when an author responds to a request from the author-created digital agent (e.g., described with respect to operation 134 in FIGS. 1A and 1B) or when an author responds to an inline note. Both the question and the answer can be added to the corpus.

In some cases, a document graph can be leveraged to identify content likely to be useful for adding to an author's corpora. A document graph can be created, for example, by tracking (with permission) interactions between users and other users (e.g., because of communications over a communication channel or because of relationships identified in an organization such as groups/managers and departments) and interactions between users and content/documents or portions of content/documents (e.g., reuse, edit, comment, view, etc.).

Content that is deliberately created for a corpus or content that is created for other purposes, but identified by the author as useful for a corpus, can be added to a corpus.

In addition to adding content to corpora, authors can add tags to the content or files at the time of adding or when reviewing what is in a corpus. The tags may be keywords. In some cases, the tags are positive and negative indicators (or weights). For example, an author can apply a positive tag to content that supports their topic and a negative tag to content that provides negative treatment to their topic. The tags may be stored as part of the data structure indicating the content in a corpus or stored as part of the metadata of the content itself.

Figure 12A:
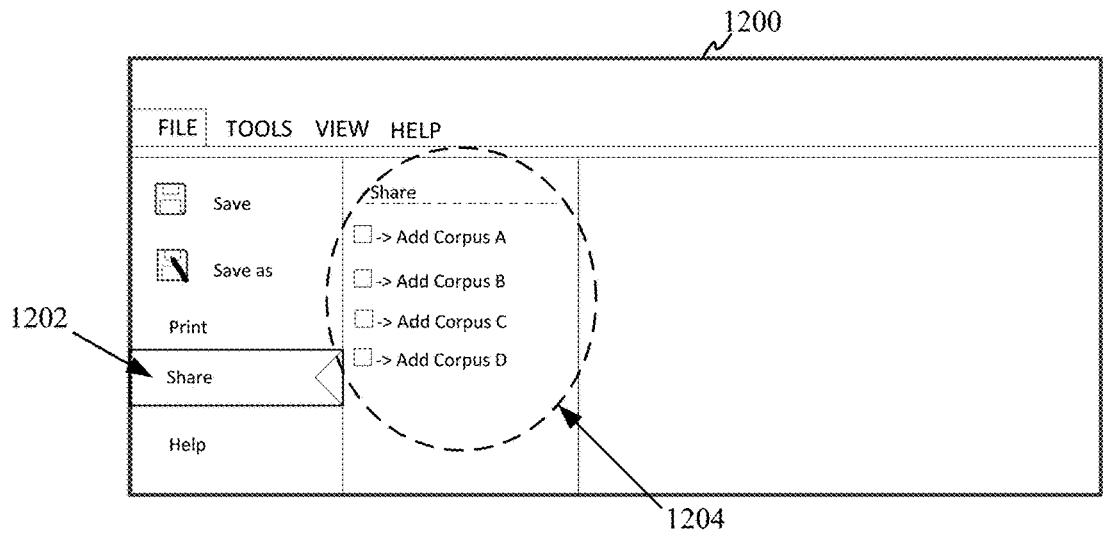
FIGS. 12A-12C illustrate example scenarios of attaching one or more corpora to a document.
Figure 12B:
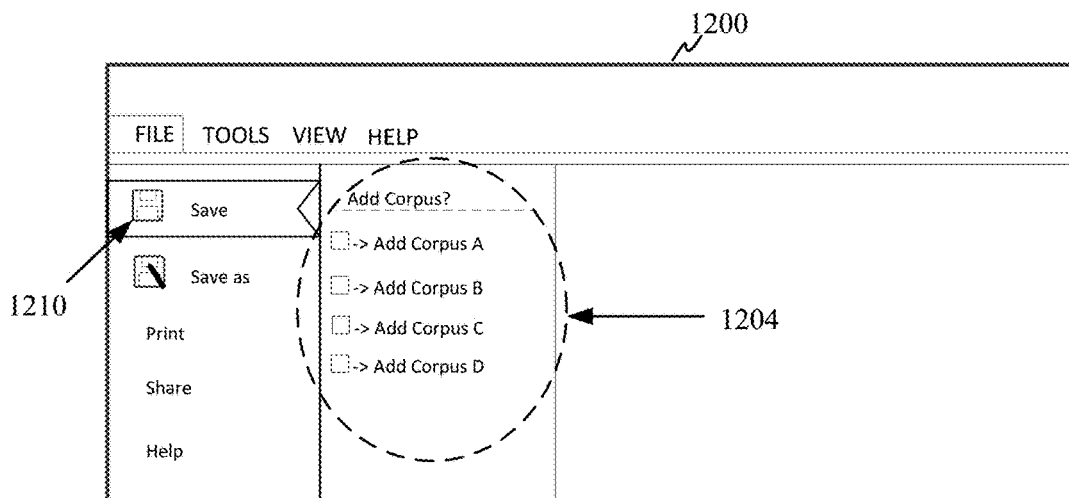
Figure 12C:
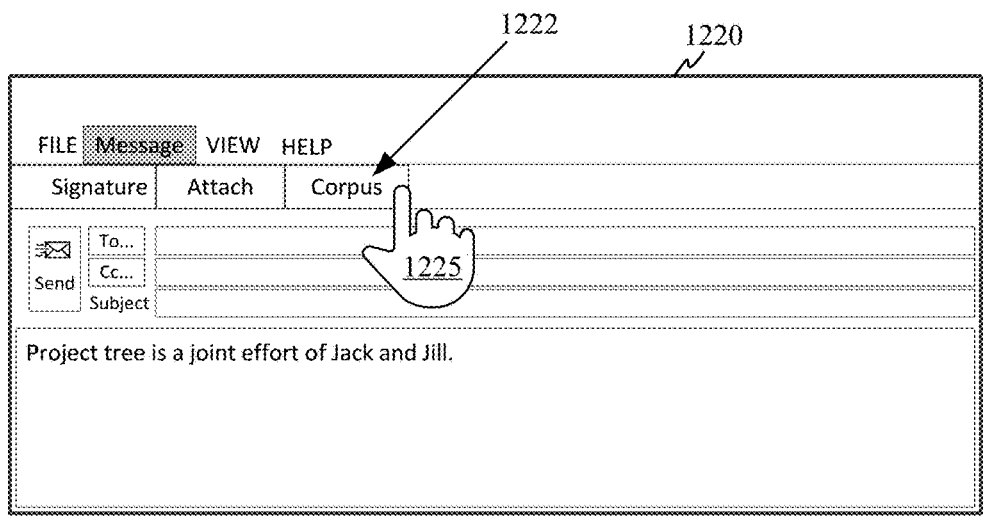

FIGS. 12A-12C illustrate example scenarios of attaching one or more corpora to a document. As illustrated in FIG. 12A, when assigning a corpus to a document, a work flow for sharing a document (e.g., share to a publishing service, email a user, upload to cloud storage, upload to an enterprise file management system) can include attaching one or more corpora of the author. The application in which the user is sharing their contents can perform the operation sending the request to get a list of the authors content as described with respect to operations 201, 202, 204, and 206. Referring to FIG. 12A, an author in a content creation application 1200 may select to share 1202 their content and, during the workflow, can select to attach one or more corpora 1204 to the file. The functionality of attaching content corpora to a document enables a way of authoring that allows an author to associate content to a document that is opaque to the content consumer. Indeed, in most cases, the content in the corpora is never visible in its entirety to the reader of the document.

Referring to FIG. 12B, corpora 1204 can be added/attached to a document upon a save command 1210 or operation.

In addition to making the attachment of a corpus available to content creation applications, other applications such as email applications 1220 can include a mechanism to attach a corpus such as shown in FIG. 12C, where a menu command 1222 is provided to associate a corpus with an email (and selection 1225 of the menu command 1222 can invoke attach corpus API (e.g., 104) and corresponding processes (e.g., 201, 202, 204, and 206, 211, 212, 214 of FIG. 2). The attaching of a corpus to a document can cause information or code to be added to the document. As described in more detail with respect to FIGS. 8A-8C, metadata or other opaque-to-the-user (or recipient) information can be part of the file, content, email, or other document to keep the author-created digital agent appropriately connected to the document itself.

Figure 13:
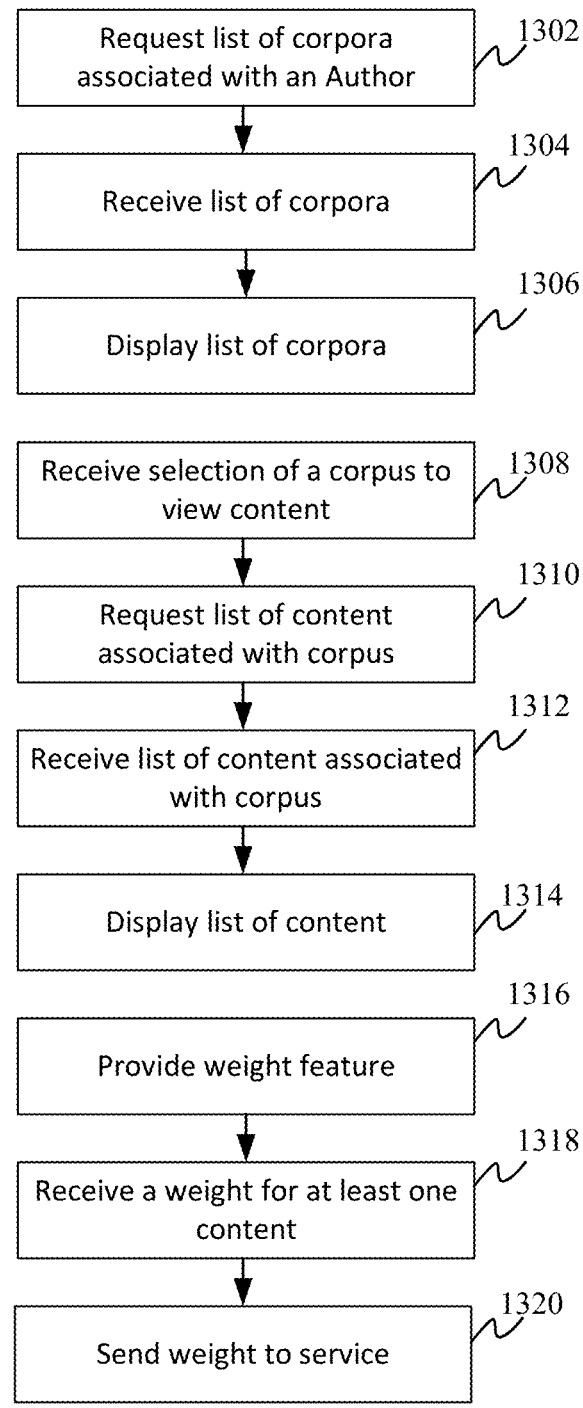
FIG. 13 processes that may be carried out by a corpus editing tool feature.

FIG. 13 illustrates processes that may be carried out by a corpus editing tool feature. The corpus editing tool feature may be a stand-alone application or feature or may be integrated with other applications. The tool feature can be used to manage the connections between a document, an author's corpora, and the content associated with the author's corpora. A corpus editing tool feature can include functionality including, but not limited to, one or more of adding and removing content from a corpus, generating new content including frequently asked questions and corresponding answers for those frequently asked questions, answering questions consumers may have asked, indicating positive or negative treatment (or other weighting or tagging of content), and adding or removing a document's association with a corpus.

Referring to FIG. 13, the tool feature may request, from the corpus service (e.g., service 100, 610), a list of corpora associated with an author (1302), receive a list of corpora from the corpus service (1304), and display the list of corpora (1306). The tool feature can receive a selection of a corpus to view content assigned to that corpus (1308), request, from the corpus service, a list of content associated with the corpus in response to that selection (1310), receive the list of content from the corpus service (1312), and display the list of content (1314). Tagging and weighting functionality can be included. For example, the tool can provide a weight feature (1316), receive a weight for at least one content (1318), and send the weight to the service (1320). The weight can indicate positive treatment or negative treatment for the content, which can be used by the service when ranking results in response to a query.

The tool feature can also provide a dashboard for the user to identify how often certain content is accessed, for example, in response to a request by a consumer to the author-created digital agent.

Figure 14:
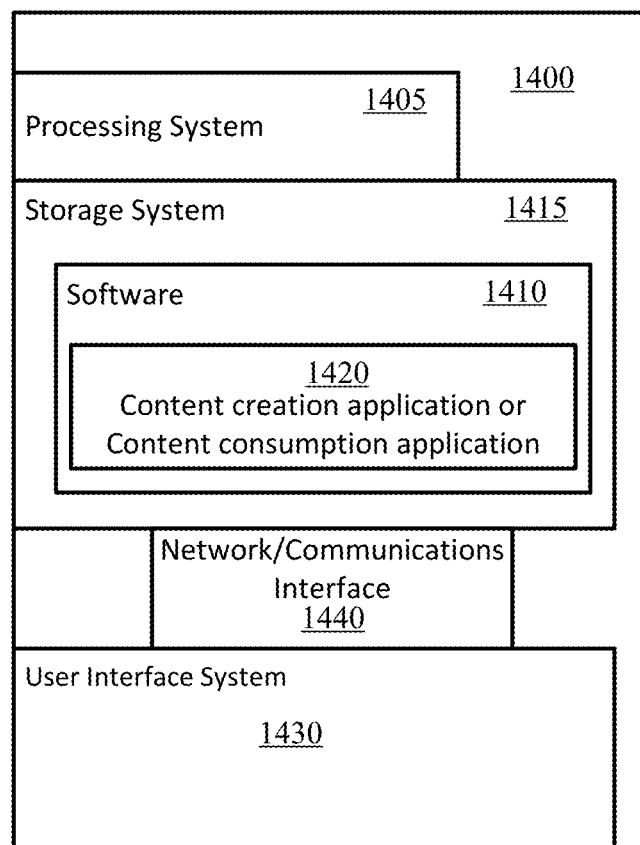
FIG. 14 illustrates components of a computing device that may be used in certain embodiments described herein.

FIG. 14 illustrates components of a computing device that may be used in certain embodiments described herein. Referring to FIG. 14, system 1400 may represent a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, a smart television, or an electronic whiteboard or large form-factor touchscreen. Accordingly, more or fewer elements described with respect to system 1400 may be incorporated to implement a particular computing device.

System 1400 includes a processing system 1405 of one or more processors to transform or manipulate data according to the instructions of software 1410 stored on a storage system 1415. Examples of processors of the processing system 1405 include general purpose central processing units (CPUs), graphics processing units (GPUs), field programmable gate arrays (FPGAs), application specific processors, and logic devices, as well as any other type of processing device, combinations, or variations thereof. The processing system 1405 may be, or is included in, a system-on-chip (SoC) along with one or more other components such as network connectivity components, sensors, video display components.

The software 1410 can include an operating system and application programs, including a content creation application or a content consumption application (if not in the form of a content creation application) 1420. In some cases, certain elements or features of the author-created digital agent may be stored and executed at computing system 1400. Device operating systems generally control and coordinate the functions of the various components in the computing device, providing an easier way for applications to connect with lower level interfaces like the networking interface. Non-limiting examples of operating systems include WINDOWS from Microsoft Corp., APPLE iOS from Apple, Inc., ANDROID OS from Google, Inc., and the Ubuntu variety of the Linux OS from Canonical.

It should be noted that the operating system may be implemented both natively on the computing device and on software virtualization layers running atop the native device operating system (OS). Virtualized OS layers, while not depicted in FIG. 14, can be thought of as additional, nested groupings within the operating system space, each containing an OS, application programs, and APIs.

Storage system 1415 may comprise any computer readable storage media readable by the processing system 1405 and capable of storing software 1410 including the content creation application 1420 (as well as any local elements or features of an author-created digital agent).

Storage system 1415 may include volatile and nonvolatile memories, removable and non-removable media implemented in any method or technology for storage of information, such as computer readable instructions, data structures, program modules, or other data. Examples of storage media of storage system 1415 include random access memory, read only memory, magnetic disks, optical disks, CDs, DVDs, flash memory, magnetic cassettes, magnetic tape, magnetic disk storage or other magnetic storage devices, or any other suitable storage media.

Storage system 1415 may be implemented as a single storage device but may also be implemented across multiple storage devices or sub-systems co-located or distributed relative to each other. Storage system 1415 may include additional elements, such as a controller, capable of communicating with processing system 1405.

The system can further include user interface system 1430, which may include input/output (I/O) devices and components that enable communication between a user and the system 1400. User interface system 1430 can include input devices such as a mouse, track pad, keyboard, a touch device for receiving a touch gesture from a user, a motion input device for detecting non-touch gestures and other motions by a user, a microphone for detecting speech, and other types of input devices and their associated processing elements capable of receiving user input.

The user interface system 1430 may also include output devices such as display screen(s), speakers, haptic devices for tactile feedback, and other types of output devices. In certain cases, the input and output devices may be combined in a single device, such as a touchscreen display which both depicts images and receives touch gesture input from the user. A touchscreen (which may be associated with or form part of the display) is an input device configured to detect the presence and location of a touch. The touchscreen may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen is incorporated on top of a display as a transparent layer to enable a user to use one or more touches to interact with objects or other information presented on the display.

A natural user interface (NUI) may be included as part of the user interface system 1430. Examples of NUI methods include those relying on speech recognition, touch and stylus recognition, gesture recognition both on screen and adjacent to the screen, air gestures, head and eye tracking, voice and speech, vision, touch, hover, gestures, and machine intelligence. Accordingly, the systems described herein may include touch sensitive displays, voice and speech recognition, intention and goal understanding, motion gesture detection using depth cameras (such as stereoscopic or time-of-flight camera systems, infrared camera systems, red-green-blue (RGB) camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods).

Visual output may be depicted on the display (not shown) in myriad ways, presenting graphical user interface elements, text, images, video, notifications, virtual buttons, virtual keyboards, or any other type of information capable of being depicted in visual form.

The user interface system 1430 may also include user interface software and associated software (e.g., for graphics chips and input devices) executed by the OS in support of the various user input and output devices. The associated software assists the OS in communicating user interface hardware events to application programs using defined mechanisms. The user interface system 1430 including user interface software may support a graphical user interface, a natural user interface, or any other type of user interface.

Network interface 1440 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS, which informs applications of communications events when necessary.

Figure 15:
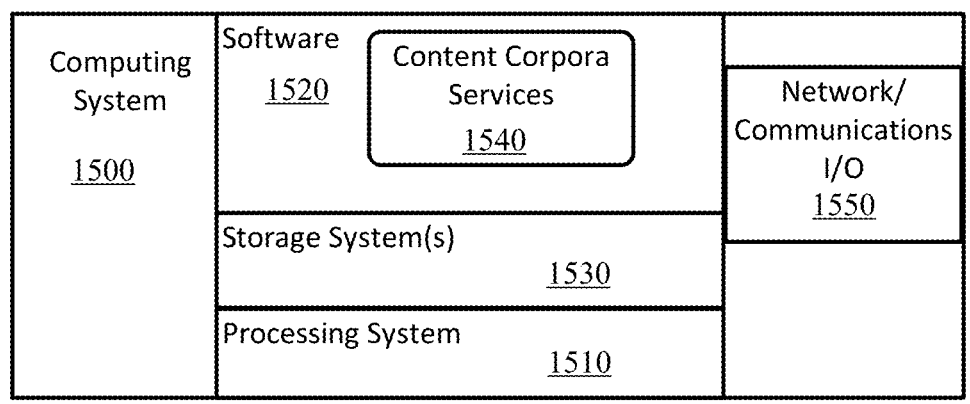
FIG. 15 illustrates components of a computing system that may be used in certain embodiments described herein.

FIG. 15 illustrates components of a computing system that may be used in certain embodiments described herein. Referring to FIG. 15, system 1500 may be implemented within a single computing device or distributed across multiple computing devices or sub-systems that cooperate in executing program instructions. The system 1500 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

The system 1500 can include a processing system 1510, which may include one or more processors and/or other circuitry that retrieves and executes software 1520 from storage system 1530. Processing system 1510 may be implemented within a single processing device but may also be distributed across multiple processing devices or sub-systems that cooperate in executing program instructions.

Storage system(s) 1530 can include any computer readable storage media readable by processing system 1510 and capable of storing software 1520. Storage system 1530 may be implemented as a single storage device but may also be implemented across multiple storage devices or sub-systems co-located or distributed relative to each other. Storage system 1530 may include additional elements, such as a controller, capable of communicating with processing system 1510. Storage system 1530 may also include storage devices and/or sub-systems on which data such as entity-related information is stored.

Software 1520, including content corpora service (or if representing a digital agent service, the software supporting the various author-created digital agents) 1540, may be implemented in program instructions and among other functions may, when executed by system 1500 in general or processing system 1510 in particular, direct the system 1500 or processing system 1510 to operate as described herein.

System 1500 may represent any computing system on which software 1520 may be staged and from where software 1520 may be distributed, transported, downloaded, or otherwise provided to yet another computing system for deployment and execution, or yet additional distribution.

In embodiments where the system 1500 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A communication interface 1550 may be included, providing communication connections and devices that allow for communication between system 1500 and other computing systems (not shown) over a communication network or collection of networks (not shown) or the air.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Embodiments may be implemented as a computer process, a computing system, or as an article of manufacture, such as a computer program product or computer-readable medium. Certain methods and processes described herein can be embodied as software, code and/or data, which may be stored on one or more storage media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system (and executable by a processing system) and encoding a computer program of instructions for executing a computer process. It should be understood that as used herein, in no case do the terms "storage media", "computer-readable storage media" or "computer-readable storage medium" consist of transitory carrier waves or propagating signals. Instead, "storage" media refers to non-transitory media.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A system comprising:
a processing system;
a storage system; and
instructions stored on the storage system that when executed by the processing system direct the processing system to:
receive a command to add a selected content to a corpus;
communicate an add content request to indicate a mapping between the corpus and the selected content, the add content request comprising content information of the selected content;
receive a command to attach the corpus having the selected content to a document, the corpus indicating content to be associated with the document but that is not visible in its entirety to a consumer of the document when the consumer starts to view the document on a display;
communicate an attach corpus request to indicate a mapping of the corpus to the document, the attach corpus request comprising a document identifier and an identifier of the corpus having the selected content,
wherein the mapping between the corpus and the content and the mapping of the corpus to the document comprises a mapping data structure representing a relationship between the content and the corpus and between the corpus and the document such that bounded, curated content, including the selected content, is associated with the document via the corpus attached to the document;
receive a request, by the consumer of the document while the consumer is viewing the document on the display, to search for a topic;
search corpora, including the corpus, that are attached to the document using the topic;
provide the selected content to be visible on the display to the consumer of the document;
generate a message, for the consumer of the document, to an author of the document;
receive a response to the message, the response written by the author of the document; and
store the response and the message in at least one corpus associated with the author.

2. The system of claim 1, further comprising instructions that direct the processing system to:
request a list of corpora associated with a user;
receive the list of corpora associated with the user; and
receive a selection of a new corpus or at least one corpus of the list of corpora;
wherein the add content request further comprises a corpus identifier for the new corpus or the at least one corpus of the list of corpora.

3. The system of claim 1, wherein the content information comprises a content identifier, a document identifier, a location identifier, or the content itself.

4. The system of claim 1, wherein the instructions to attach a corpus to a document direct the processing system to:
insert a script for an author-created digital agent in metadata of the document.

5. The system of claim 4, wherein the script comprises a digital agent identifier.

6. The system of claim 1, further comprising instructions that direct the processing system to:
request a list of corpora associated with an author of the document;
receive the list of corpora associated with the author, wherein the list of corpora includes the corpus having the selected content; and
receive a selection of the corpus having the selected content, wherein the identifier of the corpus having the selected content is obtained from the selection of the corpus.

7. The system of claim 1, further comprising instructions that direct the processing system to:
request a list of corpora associated with an author of the document;
receive the list of corpora associated with the author;
receive a selection of a new corpus or at least one corpus of the list of corpora;

receive a second command to attach the new corpus or the at least one corpus to the document; and communicate a second attach corpus request to indicate a mapping of the corpus to the document, the attach corpus request comprising the document identifier of the document and a corpus identifier for the new corpus or the least one corpus of the list of corpora.

8. A method comprising:

communicating a request for a list of corpora associated with an author identifier to a corpus service, each corpus of the corpora associated with the author identifier comprising a set of curated, bound content that can be searched;

receiving, from the corpus service, the list of corpora associated with the author identifier;

receiving a selection of a new corpus or at least one corpus of the list of corpora;

communicating a request to attach the selected new corpus or the selected at least one corpus to a document to create an author-created digital agent, the request indicating a mapping of the selected new corpus or the selected at least one corpus to the document, wherein that corpus indicates content to be associated with the document but that is not visible in its entirety to a consumer of the document when the consumer starts to view the document on a display, wherein, for a corpus selected from the list of corpora, the mapping of the selected at least one corpus to the document comprises a mapping data structure representing a relationship between the set of curated, bound content for the corpus selected from the list of corpora and that corpus and between that corpus and the document such that the set of bounded, curated content for that corpus is associated with the document via that corpus attached to the document, and wherein, for the new corpus, the mapping of the selected new corpus comprises a mapping data structure representing relationship between content, the new corpus, and the document such that any content added to the new corpus is associated with the document via the new corpus attached to the document;

receiving a request, by the consumer of the document while the consumer is viewing the document on the display, to search for a topic;

searching corpora, including the selected new corpus or the selected at least one corpus that are attached to the document, using the query;

providing a particular content of an attached corpus of the searched corpora to be visible on the display to the consumer of the document;

generating a message, for the consumer of the document, to an author of the document;

receiving a response to the message, the response written by the author of the document; and storing the response and the message in at least one corpus associated with the author.

9. The method of claim 8, wherein the request for the list of corpora comprises the author identifier and additional context of a document, the additional context comprising at least one topic.

10. The method of claim 8, further comprising:

inserting a script for the author-created digital agent in metadata of the document.

11. The method of claim 10, wherein the script comprises a digital agent identifier.

12. One or more computer-readable storage media having instructions stored thereon that when executed by a processing system, direct the processing system to at least:

manage a mapping data structure;

receive a request to add content as added content to one or more corpora;

store or update a mapping of the added content to the one or more corpora in the mapping data structure;

receive a request to attach at least one corpus of the one or more corpora to a document, the at least one corpus indicating content to be associated with the document but that is not visible in its entirety to a consumer of the document when the consumer starts to view the document on a display;

store or update a mapping of the at least one corpus of the one or more corpora to the document in the mapping data structure, wherein the mapping data structure represents a relationship between the added content and each of the one or more corpora and between each of the at least one of the one or more corpora and the document such that bounded, curated content, including the added content, is associated with the document via the at least one corpus attached to the document;

receive a request, by the consumer of the document while the consumer is viewing the document on the display, to search for a topic;

search corpora, including the at least one corpus, that are attached to the document using the topic;

provide the added content to be visible on the display to the consumer of the document;

generate a message, for the consumer of the document, to an author of the document;

receive a response to the message, the response written by the author of the document; and store the response and the message in at least one corpus associated with the author.

13. The media of claim 12, further comprising instructions that direct the processing system to:

receive a request for corpora associated with an author;

determine relevant corpora by searching the mapping data structure for corpora associated with the author; and provide a list of the corpora associated with the author.

14. The media of claim 12, further comprising instructions that direct the processing system to:

receive context of the content, the context indicating author identifier and one or more topics of the content;

search the mapping data structure for a suggested corpus associated with the author identifier and comprising a relevant content based on the one or more topics; and provide a list comprising the suggested corpus.

15. The media of claim 12, wherein the request to search further comprises a document identifier, wherein the instructions further direct the processing system to:

in response to the request to search the at least one of the one or more corpora, determine corpora associated with the document identifier; and identify content associated with the corpora associated with the document identifier, wherein the instructions to search the at least one of the one or more corpora associated with the document using the query direct the processing system to search the content associated with the corpora for content relevant to the request.

16. The media of claim 12, wherein the request to search further comprises one or more corpora identifiers, wherein the instructions further direct the processing system to:

in response to the request to search the at least one of the one or more corpora, identify one or more corpora associated with the one or more corpora identifiers; and
identify content associated with the one or more corpora, wherein the instructions to search the at least one of the one or more corpora associated with the document using the query direct the processing system to search the content associated with the one or more corpora for content relevant to the request.

* * * * *